United States Patent
Caveney et al.

(10) Patent No.: US 7,978,845 B2
(45) Date of Patent: Jul. 12, 2011

(54) POWERED PATCH PANEL

(75) Inventors: Jack E. Caveney, Hinsdale, IL (US);
Ronald A. Nordin, Naperville, IL (US);
Steven A. Jacks, Villa Park, IL (US);
Donald Beran, Tinley Park, IL (US);
Brian D. Leshin, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 1262 days.

(21) Appl. No.: 11/535,544

(22) Filed: Sep. 27, 2006

(65) Prior Publication Data

US 2008/0214140 A1    Sep. 4, 2008

Related U.S. Application Data

(60) Provisional application No. 60/721,131, filed on Sep. 28, 2005.

(51) Int. Cl.
*H04M 9/00*    (2006.01)

(52) U.S. Cl. .................... 379/413; 379/387.01

(58) Field of Classification Search ............ 379/387.01, 379/395.01, 393, 413
See application file for complete search history.

(56) References Cited

U.S. PATENT DOCUMENTS

| | | | |
|---|---|---|---|
| 3,052,842 A | 9/1962 | Frohman et al. | |
| 3,573,789 A | 4/1971 | Sharp et al. | |
| 3,573,792 A | 4/1971 | Reed | |
| 3,914,561 A | 10/1975 | Schardt et al. | |
| 4,018,997 A | 4/1977 | Hoover et al. | |
| 4,072,827 A | 2/1978 | Oman | |
| 4,096,359 A | 6/1978 | Barsellotti | |
| 4,140,885 A | 2/1979 | Verhagen | |
| 4,196,316 A | 4/1980 | McEowen et al. | |
| 4,517,619 A | 5/1985 | Uekubo | |
| 4,673,246 A | 6/1987 | Schembri | |
| 4,733,389 A | 3/1988 | Puvogel | |
| 4,773,867 A | 9/1988 | Keller et al. | |
| 4,796,294 A | 1/1989 | Nakagawara | |
| 4,869,566 A | 9/1989 | Juso et al. | |
| 4,901,004 A | 2/1990 | King | |
| 4,937,825 A | 6/1990 | Ballard et al. | |

(Continued)

FOREIGN PATENT DOCUMENTS

EP    0297079    3/1992

(Continued)

OTHER PUBLICATIONS

3COM User Guide—3COM Network Jack—Model NJ200; Sep. 2002.

(Continued)

*Primary Examiner* — Walter F Briney, III
(74) *Attorney, Agent, or Firm* — Robert A. McCann; Zachary J. Smolinski; Christopher S. Clancy

(57) ABSTRACT

A powered patch panel (PPP) is disclosed that inserts power in mid-span regions of a network and provides fault-tolerance at the power supply level and the power-plane level. Information such as physical location, port status and policy enforcement information may be locally stored and utilized by a processor of the PPP to achieve network control and monitoring. A network management system and/or element management system may be provided to interface with processors of PPPs to achieve network monitoring, control and policy enforcement goals.

13 Claims, 17 Drawing Sheets

U.S. PATENT DOCUMENTS

| | | |
|---|---|---|
| 5,037,167 A | 8/1991 | Beaty |
| 5,065,798 A | 11/1991 | Alletto et al. |
| 5,089,927 A | 2/1992 | Bulan et al. |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,170,327 A | 12/1992 | Burroughs |
| 5,204,929 A | 4/1993 | Machall et al. |
| 5,222,164 A | 6/1993 | Bass, Sr. et al. |
| 5,226,120 A | 7/1993 | Brown et al. |
| 5,233,501 A | 8/1993 | Allen et al. |
| 5,265,187 A | 11/1993 | Morin et al. |
| 5,270,658 A | 12/1993 | Epstein |
| 5,305,405 A | 4/1994 | Emmons et al. |
| 5,353,367 A | 10/1994 | Czosnowski et al. |
| 5,394,503 A | 2/1995 | Dietz, Jr. et al. |
| 5,406,260 A | 4/1995 | Cummings et al. |
| 5,432,847 A | 7/1995 | Hill et al. |
| 5,483,467 A | 1/1996 | Krupka et al. |
| 5,487,666 A | 1/1996 | DiGiovanni |
| 5,521,902 A | 5/1996 | Ferguson |
| 5,532,603 A | 7/1996 | Bottman |
| 5,546,282 A | 8/1996 | Hill et al. |
| 5,550,755 A | 8/1996 | Martin et al. |
| 5,583,874 A | 12/1996 | Smith et al. |
| 5,675,813 A | 10/1997 | Holmdahl |
| 5,684,796 A | 11/1997 | Abidi et al. |
| 5,726,972 A | 3/1998 | Ferguson |
| 5,727,055 A | 3/1998 | Ivie et al. |
| 5,754,112 A | 5/1998 | Novak |
| 5,764,043 A | 6/1998 | Czosnowski et al. |
| 5,790,041 A | 8/1998 | Lee |
| 5,832,071 A | 11/1998 | Voelker |
| 5,847,557 A | 12/1998 | Fincher et al. |
| 5,854,824 A | 12/1998 | Bengal et al. |
| 5,870,626 A | 2/1999 | Lebeau |
| 5,876,240 A | 3/1999 | Derstine et al. |
| 5,878,030 A | 3/1999 | Norris |
| 5,892,299 A * | 4/1999 | Siewert et al. .................. 307/85 |
| 5,892,756 A | 4/1999 | Murphy |
| 5,898,837 A | 4/1999 | Guttman et al. |
| 5,915,425 A | 6/1999 | Nilsson et al. |
| 5,915,993 A | 6/1999 | Belopolsky et al. |
| 5,923,663 A | 7/1999 | Bontemps et al. |
| 5,944,535 A | 8/1999 | Bullivant et al. |
| 6,002,331 A | 12/1999 | Laor |
| 6,041,352 A | 3/2000 | Burdick et al. |
| 6,067,014 A | 5/2000 | Wilson |
| 6,078,113 A | 6/2000 | True et al. |
| 6,086,415 A | 7/2000 | Sanchez et al. |
| 6,094,261 A | 7/2000 | Contarino, Jr. |
| 6,115,468 A | 9/2000 | DeNicolo |
| 6,175,865 B1 | 1/2001 | Dove et al. |
| 6,218,930 B1 | 4/2001 | Katzenberg et al. |
| 6,222,908 B1 | 4/2001 | Bartolutti et al. |
| 6,229,538 B1 | 5/2001 | McIntyre et al. |
| 6,234,830 B1 | 5/2001 | Ensz et al. |
| 6,243,510 B1 | 6/2001 | Rauch |
| 6,285,293 B1 | 9/2001 | German et al. |
| 6,295,356 B1 | 9/2001 | DeNicolo |
| 6,330,307 B1 | 12/2001 | Bloch et al. |
| 6,348,874 B1 | 2/2002 | Cole et al. |
| 6,350,148 B1 | 2/2002 | Bartolutti et al. |
| 6,381,283 B1 | 4/2002 | Bhardwaj et al. |
| 6,421,322 B1 | 7/2002 | Koziy et al. |
| 6,424,710 B1 | 7/2002 | Bartolutti et al. |
| 6,434,716 B1 | 8/2002 | Johnson et al. |
| 6,437,894 B1 | 8/2002 | Gilbert et al. |
| 6,446,127 B1 | 9/2002 | Schuster et al. |
| 6,448,899 B1 | 9/2002 | Thompson |
| 6,449,348 B1 | 9/2002 | Lamb et al. |
| 6,453,014 B1 | 9/2002 | Jacobson et al. |
| 6,456,768 B1 | 9/2002 | Boncek et al. |
| 6,457,992 B2 | 10/2002 | Posey et al. |
| 6,457,993 B1 | 10/2002 | Espenshade |
| 6,473,608 B1 | 10/2002 | Lehr et al. |
| 6,483,712 B1 | 11/2002 | Oliphant et al. |
| 6,496,105 B2 | 12/2002 | Fisher et al. |
| 6,496,859 B2 | 12/2002 | Roy et al. |
| 6,499,861 B1 | 12/2002 | German et al. |
| 6,522,737 B1 | 2/2003 | Bartolutti et al. |
| 6,523,070 B1 | 2/2003 | Stapleton et al. |
| 6,535,983 B1 | 3/2003 | McCormack et al. |
| 6,541,878 B1 | 4/2003 | Diab |
| 6,546,494 B1 | 4/2003 | Jackson et al. |
| 6,561,827 B2 | 5/2003 | Frostrom et al. |
| 6,563,824 B1 | 5/2003 | Bhatia et al. |
| 6,570,974 B1 | 5/2003 | Gerszberg et al. |
| 6,571,181 B1 | 5/2003 | Rakshani et al. |
| 6,574,481 B1 | 6/2003 | Rathnasabapathy et al. |
| 6,574,586 B1 | 6/2003 | David et al. |
| 6,577,243 B1 | 6/2003 | Dannenmann et al. |
| 6,577,622 B1 | 6/2003 | Schuster et al. |
| 6,580,697 B1 | 6/2003 | Gardner et al. |
| 6,580,785 B2 | 6/2003 | Bremer et al. |
| 6,587,454 B1 | 7/2003 | Lamb |
| 6,594,231 B1 | 7/2003 | Byham et al. |
| 6,594,707 B1 | 7/2003 | Rubinstein et al. |
| 6,601,097 B1 | 7/2003 | Cheston et al. |
| 6,603,220 B2 | 8/2003 | Vergnaud |
| 6,603,741 B1 | 8/2003 | Poulter et al. |
| 6,611,580 B1 | 8/2003 | Dahan et al. |
| 6,614,781 B1 | 9/2003 | Elliott et al. |
| 6,614,785 B1 | 9/2003 | Huai et al. |
| 6,626,697 B1 | 9/2003 | Martin et al. |
| 6,628,623 B1 | 9/2003 | Noy |
| 6,629,269 B1 | 9/2003 | Kahkoska |
| 6,638,112 B1 | 10/2003 | Walker et al. |
| 6,640,308 B1 | 10/2003 | Keyghobad et al. |
| 6,643,566 B1 | 11/2003 | Lehr et al. |
| 6,643,595 B2 | 11/2003 | Rakshani et al. |
| 6,646,656 B1 | 11/2003 | Walker et al. |
| 6,650,901 B1 | 11/2003 | Schuster et al. |
| 6,654,387 B1 | 11/2003 | Beser et al. |
| 6,657,991 B1 | 12/2003 | Akgun et al. |
| 6,658,098 B2 | 12/2003 | Lamb et al. |
| 6,665,611 B1 | 12/2003 | Oran et al. |
| 6,674,745 B1 | 1/2004 | Schuster et al. |
| 6,675,308 B1 | 1/2004 | Thomsen |
| 6,678,250 B1 | 1/2004 | Grabelsky et al. |
| 6,678,357 B2 | 1/2004 | Stumer et al. |
| 6,678,728 B1 | 1/2004 | Uppunda et al. |
| 6,681,252 B1 | 1/2004 | Schuster et al. |
| 6,684,179 B1 | 1/2004 | David |
| 6,688,910 B1 | 2/2004 | Macauley |
| 6,691,147 B1 | 2/2004 | Arunkumar et al. |
| 6,691,161 B1 | 2/2004 | Cook et al. |
| 6,710,704 B2 | 3/2004 | Fisher et al. |
| 6,714,698 B2 | 3/2004 | Pfeiffer et al. |
| 6,715,087 B1 | 3/2004 | Vergnaud et al. |
| 6,725,177 B2 | 4/2004 | David et al. |
| 6,750,643 B2 | 6/2004 | Hwang et al. |
| 6,778,911 B2 | 8/2004 | Opsal et al. |
| 6,784,802 B1 | 8/2004 | Stanescu |
| 6,798,944 B2 | 9/2004 | Pfeiffer et al. |
| 6,802,735 B2 | 10/2004 | Pepe et al. |
| 6,810,416 B1 | 10/2004 | Dichter |
| 6,823,063 B2 | 11/2004 | Mendoza |
| 6,841,979 B2 | 1/2005 | Berson et al. |
| 6,857,897 B2 | 2/2005 | Conn |
| 6,871,156 B2 | 3/2005 | Wallace et al. |
| 6,898,368 B2 | 5/2005 | Colombo et al. |
| 6,916,206 B2 | 7/2005 | Ferentz |
| 6,992,491 B1 | 1/2006 | Lo et al. |
| 7,005,861 B1 | 2/2006 | Lo et al. |
| 7,014,500 B2 | 3/2006 | Belesimo |
| 7,027,704 B2 | 4/2006 | Caveney et al. |
| 7,028,087 B2 | 4/2006 | Caveney |
| 7,068,043 B1 | 6/2006 | Lo et al. |
| 7,068,044 B1 | 6/2006 | Lo et al. |
| 7,160,143 B2 | 1/2007 | David et al. |
| 7,200,929 B2 | 4/2007 | Coffey et al. |
| 7,207,846 B2 | 4/2007 | Caveney et al. |
| 7,234,944 B2 | 6/2007 | Nordin et al. |
| 7,280,032 B2 | 10/2007 | Aekins et al. |
| 7,297,018 B2 | 11/2007 | Frohlich et al. |

| | | |
|---|---|---|
| 2002/0069277 A1 | 6/2002 | Caveney |
| 2002/0071394 A1 | 6/2002 | Koziy et al. |
| 2002/0090858 A1 | 7/2002 | Caveney |
| 2002/0116485 A1 | 8/2002 | Black et al. |
| 2002/0191553 A1 | 12/2002 | Lehr et al. |
| 2003/0036819 A1 | 2/2003 | Lehr et al. |
| 2003/0061393 A1 | 3/2003 | Steegmans et al. |
| 2003/0061522 A1 | 3/2003 | Ke et al. |
| 2003/0099076 A1 | 5/2003 | Elkayam et al. |
| 2003/0146765 A1 | 8/2003 | Darshan et al. |
| 2003/0152087 A1 | 8/2003 | Shahoumian et al. |
| 2003/0154038 A1 | 8/2003 | Rakshani et al. |
| 2003/0154273 A1 | 8/2003 | Caveney |
| 2003/0154276 A1 | 8/2003 | Caveney |
| 2003/0194912 A1 | 10/2003 | Ferentz |
| 2003/0202655 A1 | 10/2003 | Nattkemper et al. |
| 2003/0204356 A1 | 10/2003 | David et al. |
| 2004/0025066 A1 | 2/2004 | Jackson et al. |
| 2004/0037300 A1 | 2/2004 | Lehr et al. |
| 2004/0049321 A1 | 3/2004 | Lehr et al. |
| 2004/0049359 A1 | 3/2004 | Rakshani et al. |
| 2004/0052471 A1 | 3/2004 | Colombo et al. |
| 2004/0064275 A1 | 4/2004 | Rakshani et al. |
| 2004/0065470 A1 | 4/2004 | Goodison et al. |
| 2004/0073597 A1 | 4/2004 | Caveney et al. |
| 2004/0077220 A1 | 4/2004 | Musolf et al. |
| 2004/0095933 A1 | 5/2004 | Lehr et al. |
| 2004/0148114 A1 | 7/2004 | Bell |
| 2004/0148532 A1 | 7/2004 | Bell |
| 2004/0160312 A1 | 8/2004 | Fisher et al. |
| 2004/0164619 A1* | 8/2004 | Parker et al. ............... 307/80 |
| 2004/0174251 A1 | 9/2004 | Fisher et al. |
| 2004/0201931 A1 | 10/2004 | Korcharz et al. |
| 2004/0219827 A1 | 11/2004 | David et al. |
| 2004/0260794 A1 | 12/2004 | Ferentz et al. |
| 2004/0266492 A1 | 12/2004 | Lehr et al. |
| 2005/0003795 A1 | 1/2005 | Lehr et al. |
| 2005/0041800 A1 | 2/2005 | Lehr et al. |
| 2005/0044431 A1 | 2/2005 | Lang et al. |
| 2005/0049758 A1 | 3/2005 | Lehr et al. |
| 2005/0078422 A1 | 4/2005 | Pincu et al. |
| 2005/0078700 A1 | 4/2005 | Thompson et al. |
| 2005/0080516 A1 | 4/2005 | Pincu et al. |
| 2005/0085212 A1 | 4/2005 | Peker et al. |
| 2005/0111491 A1 | 5/2005 | Caveney |
| 2005/0136729 A1 | 6/2005 | Redfield et al. |
| 2005/0141431 A1 | 6/2005 | Caveney et al. |
| 2005/0159036 A1 | 7/2005 | Caveney et al. |
| 2005/0195584 A1 | 9/2005 | AbuGhazaleh et al. |
| 2005/0221660 A1 | 10/2005 | Coffey et al. |
| 2005/0224585 A1 | 10/2005 | Durrant et al. |
| 2005/0231325 A1 | 10/2005 | Durrant et al. |
| 2005/0239339 A1 | 10/2005 | Pepe |
| 2005/0245127 A1 | 11/2005 | Nordin et al. |
| 2006/0047800 A1 | 3/2006 | Caveney et al. |
| 2006/0133368 A1* | 6/2006 | Tolliver ............... 370/389 |
| 2006/0181398 A1 | 8/2006 | Martich et al. |
| 2006/0181459 A1 | 8/2006 | Aekins et al. |
| 2006/0262727 A1 | 11/2006 | Caveney |
| 2006/0282529 A1 | 12/2006 | Nordin |
| 2007/0032124 A1 | 2/2007 | Nordin et al. |
| 2007/0117444 A1 | 5/2007 | Caveney et al. |
| 2007/0132503 A1 | 6/2007 | Nordin |
| 2007/0149045 A1 | 6/2007 | Caveney et al. |
| 2007/0207666 A1 | 9/2007 | Caveney et al. |
| 2008/0043631 A1 | 2/2008 | Caveney |
| 2008/0045075 A1 | 2/2008 | Caveney et al. |
| 2008/0049627 A1 | 2/2008 | Nordin |
| 2008/0102693 A1 | 5/2008 | Caveney et al. |
| 2008/0113560 A1 | 5/2008 | Caveney et al. |

FOREIGN PATENT DOCUMENTS

| | | |
|---|---|---|
| EP | 0575100 | 4/1998 |
| EP | 0745229 | 3/2003 |
| FR | 2680067 A1 | 8/1991 |
| GB | 2236398 A | 4/1991 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 01055854 A1 | 8/2001 |
| WO | 2004044599 | 5/2004 |
| WO | 2005072156 | 8/2005 |
| WO | 2006052686 A1 | 5/2006 |

OTHER PUBLICATIONS

Avaya Solving the Challenges of E911 Service with Avaya IP Telephony Networks; Nov. 2002.
Trends 911 over VoIP: whose responsibility?—Communication News; Jul. 2004.
Panduit—Discover the PANVIEW Solution; July 2003.
3COM NJ200 Network Jack Management Feature: Location Mapping; Sep. 2003.
3COM Unveils Next Generation of Internet Protocol Business Phone—Press Release; Mar. 4, 2004.
3COM Application Guide—Expanding User Connectivity in Education; Feb. 2004.
3COM Data Sheet—3COM Network Jack; Dec. 2003.
3COM Small Office Solutions—A Guide to Small Office Networking; Sep. 2003.
3COM and Siemon to Deliver World-Class Connectivity—Press Release; Apr. 13, 2004.
"Finding the Missing Link," Cabling Installation & Maintenance, Jun./Jul. 2002.
"IntelliMAC—The New Intelligent Cable Management Solution by ITRACS&NORDX/CDT," Press Release 2003.
"RiT Technologies Ltd. SMART Cabling System," RiT Technologies Ltd., 2004.
"Ortronics Launches iTRACS—Ready Structured Cabling Solutions," News Release Mar. 7, 2003.
"The Systimax iPatch System—Intelligent yet simple patching . . . ", CommScope, Inc., 2004.
"White Paper—Intelligent Patching," David Wilson, Nov. 2002.
"PatchView for the Enterprise (PV4E) technical background/Networks for Business," Jun. 24-26, 2003.
"RiT Technologies Ltd. Go Patch-less," May 2000 Edition of Cabling Systems.
"Molex Premise Networks/Western Europe-Real Time Patching System," Molex Prem. Networks, 2001.
"EC&M Taking Note of Patch Panel Technology," Mark McElroy, Jun. 1, 1998.

* cited by examiner

POWERED PATCH PANEL

CROSS-REFERENCE TO RELATED APPLICATIONS

This application claims the benefit of priority to U.S. Provisional Application Ser. No. 60/721,131, entitled "Powered Patch Panel," filed on Sep. 28, 2005.

BACKGROUND

Networks that provide power over network cables are attractive because installing a separate power grid is not required when installing equipment having power requirements that may be met by the network connection. Improvements in inserting power into network cables are needed.

SUMMARY

A powered patch panel (PPP) is disclosed that is Telecommunication Industry Association (TIA) category 5e and 6 compatible (i.e., supports communications in the gigahertz range), that is compatible with corresponding international standard categories, and that supports power-over-network (PoN) such as power-over-Ethernet (PoE). For example, a PPP may be used in mid-span regions of a network in both cross-connect and interconnect configurations. Thus, the PPP may be incorporated as part of a building permanent link by being directly connected to horizontal cabling. When so incorporated, the building permanent link is category 5e and 6 compliant and may support power-over-network (PoN) such as power-over-Ethernet (PoE).

In cross-connect and interconnect configurations that include a patch panel, the PPP may replace the patch panel without requiring additional rack space, provide identical patching flexibility, insert power into network cables, and provide intelligent processing to perform local control and monitoring functions as well as enforcement of network policies.

The PPP may include two power supply input ports so that two power supplies may be used in a fault-tolerant manner to power each PPP. Further, PPP electronics may be separated into at least two power-independent portions, each powered by a separately supplied power-plane. Combined power from the power supply inputs may be converted into at least two independent power outputs that supply power to the two power-planes. One of the power-planes may provide power to a common circuit that includes a processor and supporting hardware while the other power-plane may provide power for a port circuit.

All communications between circuits of the common circuit and port circuit may be power-isolated by either or both optical couplers or capacitors (power isolators), for example, so that power failure in one power-plane does not result in power failure in the other power-plane. In this way, the port circuit and/or common circuit may perform its functions even in the event of power failure in the other circuit. Thus, fault-tolerance may be achieved at the power-plane level.

The PPP may provide powered device (PD) interrogation and power management capabilities. For example, the PPP may detect connection or disconnection of a PD, automatically determine power requirements, and supply power to the PD. Each port may be periodically checked for legacy devices (devices having PoN functionality incompatible with IEEE 802.3af) and accommodated accordingly. In addition, current limiting may be provided for each port.

The PPP may provide LED indicators corresponding to each of the ports. LED functionality may include indication of a PD connection, whether a PD is either an IEEE 802.3af compliant device or a legacy device, and a current limiting condition. Further, LEDs may be controlled to assist in moves, additions, and changes of network cable connections by changing color, turning on or off, and/or adjusting blinking rate.

Other LEDs may be provided to indicate a PPP status and/or a PPP network connection status. For example, an in-line current manager may determine voltage and current input from one or more power supplies and control a PPP LED to indicate conditions such as that the power consumption threshold has been exceeded, the voltage level input is above or below a particular threshold, or the total current output threshold has been exceeded. LED indicators may be provided for an input and an output network connection port.

The input and output network connection ports may support connection of multiple PPPs in a daisy chain configuration. Each of the network ports may be provided with an LED to indicate port status such as connection failure, for example. The daisy chain configuration may provide network connections for devices other than PPPs (such as power supplies) and assist conserving switch port utilization.

Each PPP may include a processor to provide local intelligence for monitoring and controlling PPP ports and to interface with one or more network management systems (NMSs) and/or element management systems (EMSs). On installation, local physical address information such as room number, rack number and/or position in the rack may be entered and saved in a non-volatile memory. Physical address information may also be re-entered when a PPP is reconfigured by changing horizontal cable connections, for example. The processor may upload the local physical address information to the NMS/EMS. Additionally, when PDs are either connected or disconnected, the port status in the non-volatile memory may change. These changes, together with any identifying information, may be automatically reported to the NMS/EMS or stored for later retrieval when requested by the NMS/EMS.

The NMS may provide overall network control and encompass many network devices, while the EMS may be more locally focused. For example, the EMS may be directed to a single PPP, even though it may have access to all network-connected devices. The NMS/EMS may perform functions such as:

1. monitoring:
    a. connectivity of the network or a subnet of the network,
    b. power consumption status of a PPP,
    c. connection status of a particular port of a PPP,
    d. power supply status at the PPP and/or at the power supply, and
    e. PPP network connection failure,
2. transmitting control parameters to the PPP to control:
    a. setting PPP power consumption level,
    b. prioritize power for each port with low, medium or high priorities,
    c. selectively turning ports on or off based on priorities during power outages or for testing, for example,
    d. activating port LEDs to support moves, additions, and changes of connections,
    e. download software to a PPP for software update; and
3. network policy deployment:
    a. security policy,
    b. power consumption and distribution.

The NMS/EMS may include a graphical user interface (GUI) to assist an operator to control and monitor the network. For example, the GUI may display a topology of the complete network, a portion of the network (subnet), or particular unit types such as PPPs of a subnet, for example. The GUI may display all the PPPs of a particular rack and provide information such as location address, MAC address, power consumption, and/or current limiting status of each port of any of the PPPs. In this way, the operator may view one or more statuses only of devices of interest and can efficiently determine the condition of the network or a subnet of the network.

BRIEF DESCRIPTION OF THE DRAWINGS

The invention is described in detail with reference to the following figures wherein like numerals reference like elements, and wherein.

DETAILED DESCRIPTION OF EMBODIMENTS

Figure 1:
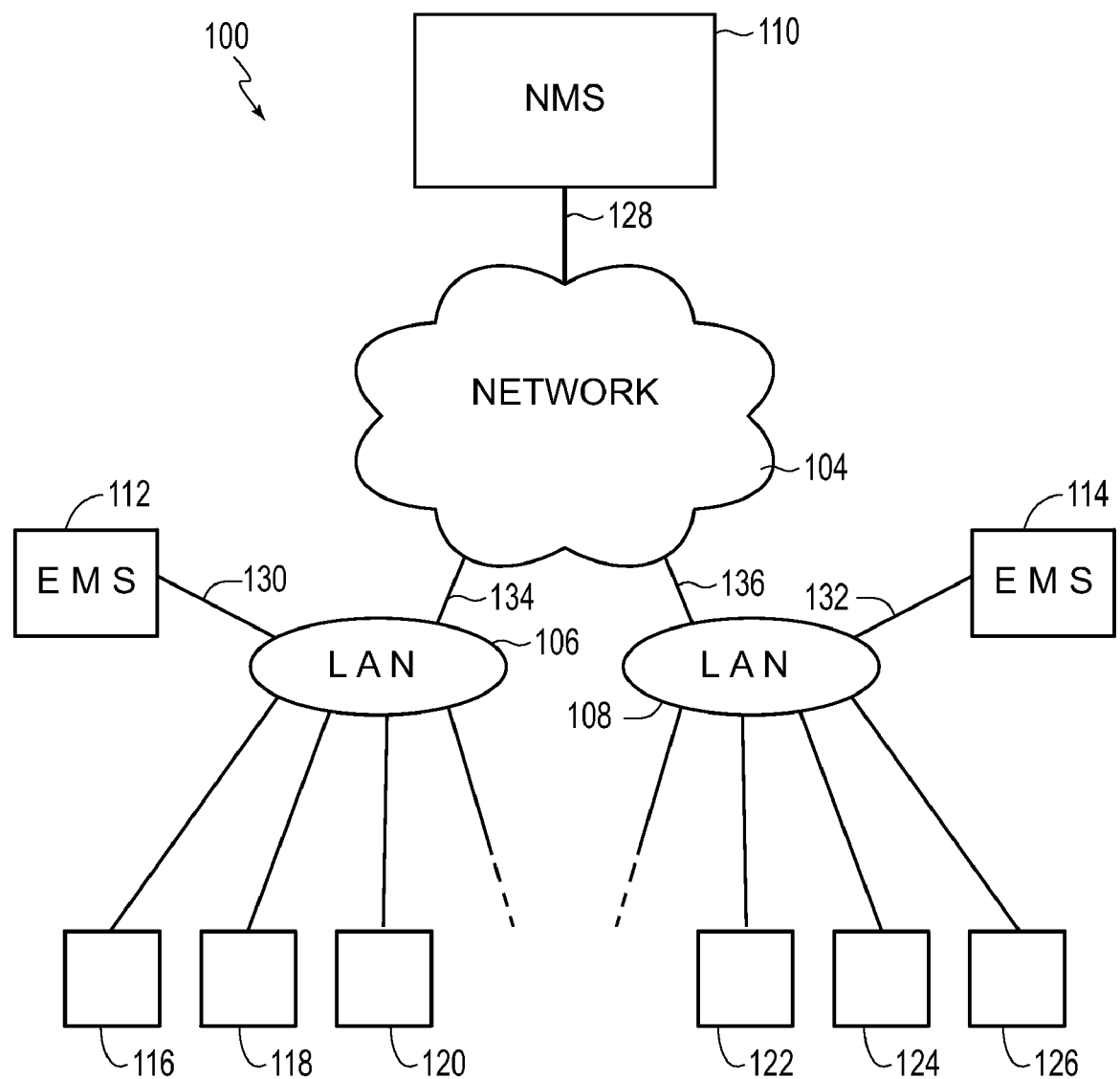
FIG. 1 shows an exemplary network system.

FIG. 1 shows an exemplary network system 100 that supports PoN, such as PoE, and provides network connectivity to end-user devices 116-126 (e.g., Voice over IP telephones, computers, etc.), one or more element management systems (EMSs) 112 and 114, and a network management system (NMS) 110 via a network 104 and local area networks (LANs) 106 and 108. LANs 106 and 108 may be connected to network 104 via links 134 and 136, respectively; EMSs 112 and 114 may be connected to LANs 106 and 108 via links 130 and 132, respectively; and NMS 110 may be connected to network 104 via link 128.

PoN may be implemented by providing power insertion units such as PPPs in LANs 106 and 108, for example. In a building installation, PPPs may be disposed in racks such as 19" racks together with other LAN equipment such as switches, hubs, patch panels, etc. The racks may be placed in an equipment closet where an external network feed enters a building, and LAN switches may be connected to the network feed via a network switch, for example.

Figure 2:
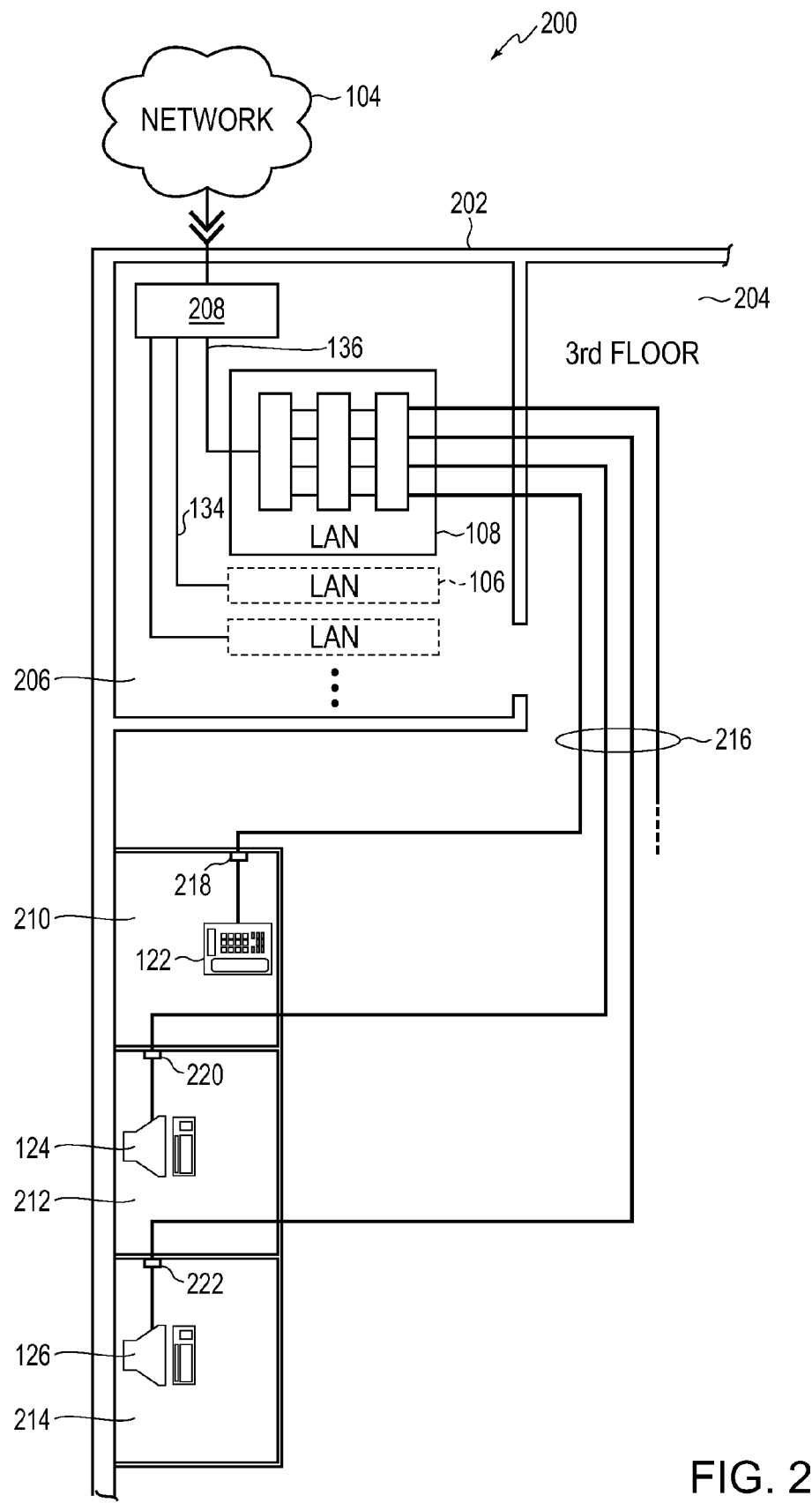
FIG. 2 shows an exemplary building floor plan.

FIG. 2 shows an exemplary equipment closet 206 of a building floor plan 200 of building 202 for floor area 204. In this example, LAN 106 serves floor 2 of building 202 and LAN 108 serves floor 3 which includes work areas 210-214. LAN 108 may be connected to network 104 via a network switch 208 that may provide connections to network 104 for all LANs of building 202. LAN 108 may be coupled to end-user devices 122-126 by horizontal cabling 216 via wall jacks 218-222 and may deliver power to end-user devices 122-126 through jacks 218-222.

Figure 3A:
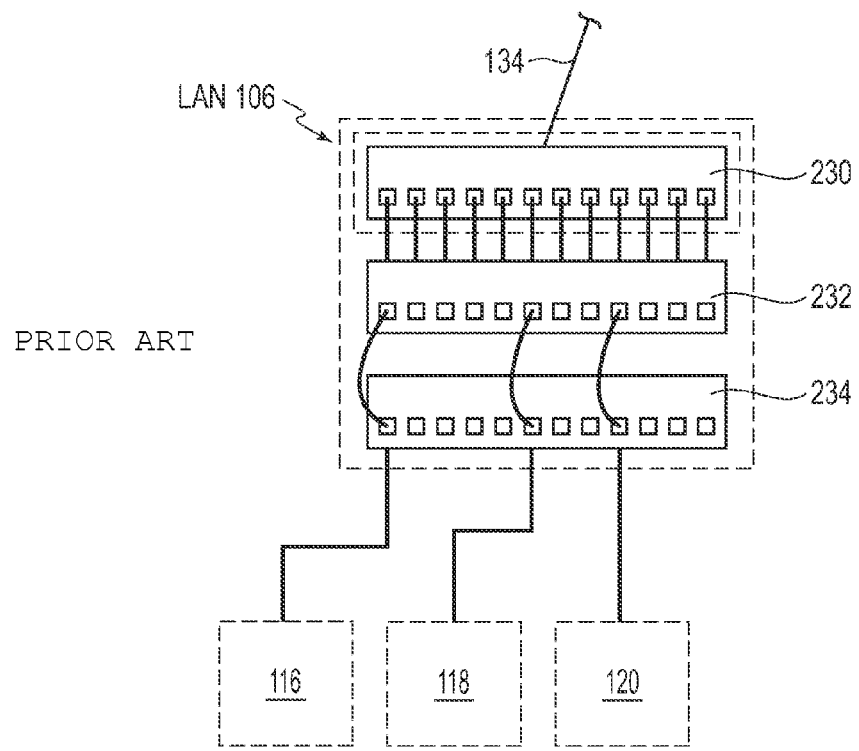
FIG. 3A shows a first conventional LAN cross-connect configuration.

LANs may have many configurations such as an Ethernet star configuration, for example, that includes an Ethernet switch (switch) that permits communication between end-user devices and/or other networks. In the star configuration, end-user devices may be connected to the switch in a cross-connect configuration or an interconnect configuration. FIG. 3A shows a first conventional LAN cross-connect configuration that uses two conventional patch panels. As shown in FIG. 3A, using LAN 106 as an example, all ports of a switch 230 are connected to a conventional patch panel 232 via cables connected from switch ports on switch 230 to punch-down blocks on the back side of conventional patch panel 232. End-user devices 116-120 may be directly or indirectly connected to the patch panel 234 via horizontal cabling and punch-down blocks (not shown) on the rear face of patch panel 234. Connections between patch panel 232 and patch panel 234 may be easily established and/or modified by changing patch cord connections between the front face ports of patch panel 232 and the front face ports of patch panel 234. Such a cross-connect configuration optimizes the ease and flexibility with which connections between the horizontal cable plant may be established, rerouted, or removed.

Figure 3B:
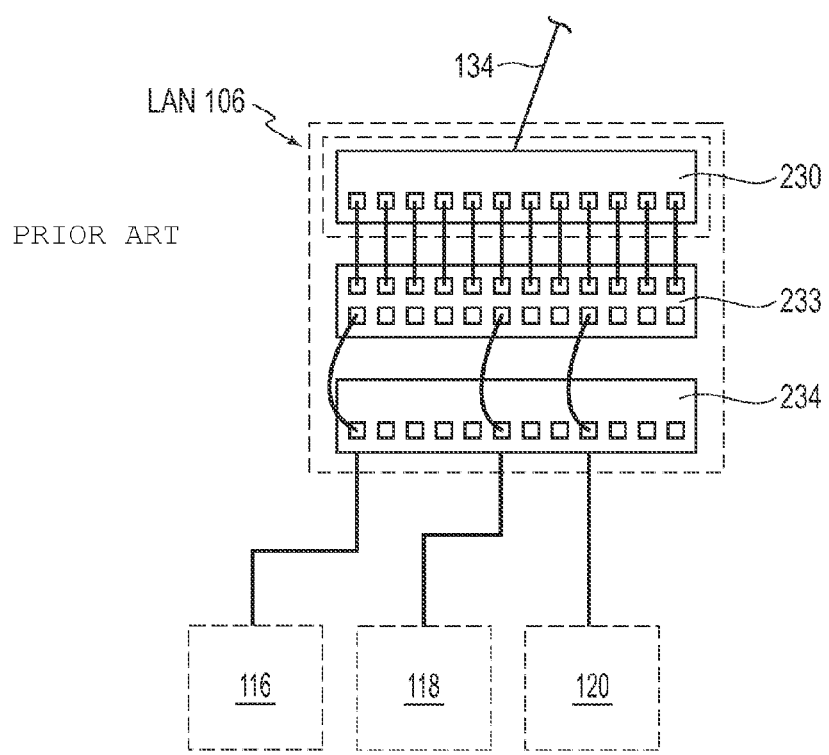
FIG. 3B shows a second conventional LAN cross-connect configuration.

FIG. 3B shows a second conventional LAN cross-connect configuration that uses a power hub and a conventional patch panel. As shown in FIG. 3B, using LAN 106 as an example, all ports of a switch 230 are connected to a conventional power hub 233 via cables connected from switch ports on switch 230 to a top row of ports on power hub 233. End-user devices 116-120 may be directly or indirectly connected to a conventional patch panel 234 via horizontal cabling and punch-down blocks (not shown) on the rear face of patch panel 234. Connections between power hub 233 and patch panel 234 may be easily established and/or modified by changing patch cord connections between the lower front face ports of power hub 233 and the front face ports of patch panel 234. As addressed above with respect to FIG. 3A, such a cross-connect configuration optimizes the ease and flexibility with which connections between the horizontal cable plant may be established, rerouted or removed.

By including power hub 233, the cross-connect configuration depicted in FIG. 3B is able to insert PoN power over the respective horizontal cable network connections. However, because both the input ports and the output ports are on the front face of the power hub, the power hub requires twice the vertical space requirements in a standard equipment rack than a conventional patch panel. Therefore, the space requirements of a large network that uses power hubs in a cross-connect configuration are significantly greater than the space requirements of a patch panel-based cross-connect configuration.

The majority of deployed, large scale network infrastructure layouts were designed prior to the widespread acceptance of PoN. Therefore, the majority of deployed cross-connect configurations and the equipment rooms which accommodate those configurations were based upon equipment rack counts and internal equipment rack layouts based upon the use of a cross-connect configuration that uses standard equipment racks and single-height conventional patch panels, as shown in FIG. 3A.

Theoretically, a network administrator should be able to introduce PoN service to a network by replacing a conventional patch panel (e.g., patch panel 232) as shown in the configuration shown in FIG. 3A with a power hub (e.g., power hub 233) to obtain the configuration shown in FIG. 3B. However, the increased vertical height requirements of the power hubs typically prevent implementation of such a simple approach. Due to the increased vertical rack space requirements of a power hub, insertion of PoN within a deployed cross-connect-based network infrastructure using power hubs can result in significant added expenses by requiring:
1. changes to internal rack configurations and cable configurations;
2. equipment racks to be added to equipment rooms;
3. expansion of equipment rooms to accommodate an increased number of equipment racks;
4. rearrangement of existing cabling and cable tray configurations to accommodate changes in equipment rack layouts.

The PPP supports insertion of PoN service without increasing, or otherwise adversely impacting, equipment rack space requirements as the PPP may have substantially the same dimensions as a conventional patch panel. Therefore, the PPP allows a new equipment room that uses PPPs for PoN insertion to be designed with a reduced number of equipment racks and reduced overall floor space requirements over a new equipment room design that uses power hubs for PoN insertion. Further, the PPP allows PoN service to be seamlessly inserted within any deployed network that uses conventional patch panels without affecting existing equipment rack or cable configurations, thereby greatly reducing the total cost of inserting PoN into an existing network, and allowing PoN service to be inserted within existing networks for which similar PoN insertion using power hubs would have been cost prohibitive.

Figure 4A:
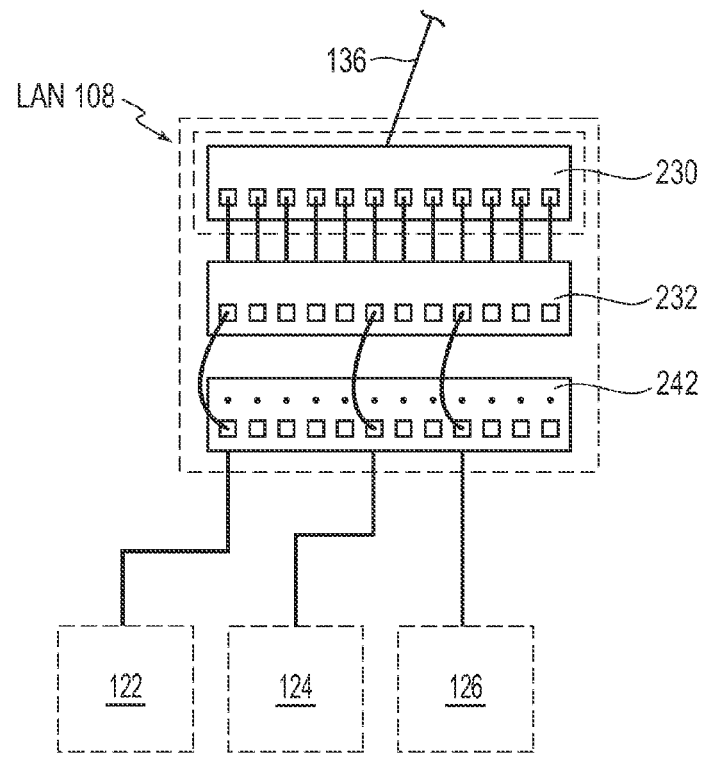
FIG. 4A shows an exemplary PPP LAN cross-connect configuration.

FIG. 4A shows an exemplary PPP-based LAN cross-connect configuration that supports PoN service. As shown in FIG. 4A, using LAN 108 as an example, all ports of a switch 230 are connected to a conventional patch panel 232 via cables connected from switch ports on switch 230 to punch-down blocks on the back side of conventional patch panel 232. End-user devices 122-126 may be directly or indirectly connected to a PPP 242 via horizontal cabling and punch-down blocks (not shown) on the rear face of PPP 242. Connections between patch panel 232 and PPP 242 may be easily established and/or modified by changing patch cord connections between the front face ports of patch panel 232 and the front face ports of PPP 242. Please note that the position of patch panel 232 and PPP 242 could be interchanged, without affecting the capabilities of the LAN cross-connect configuration shown in FIG. 4A. Further, additional patch panels may be inserted between either of the configurations described above and the building horizontal cabling.

Figure 4B:
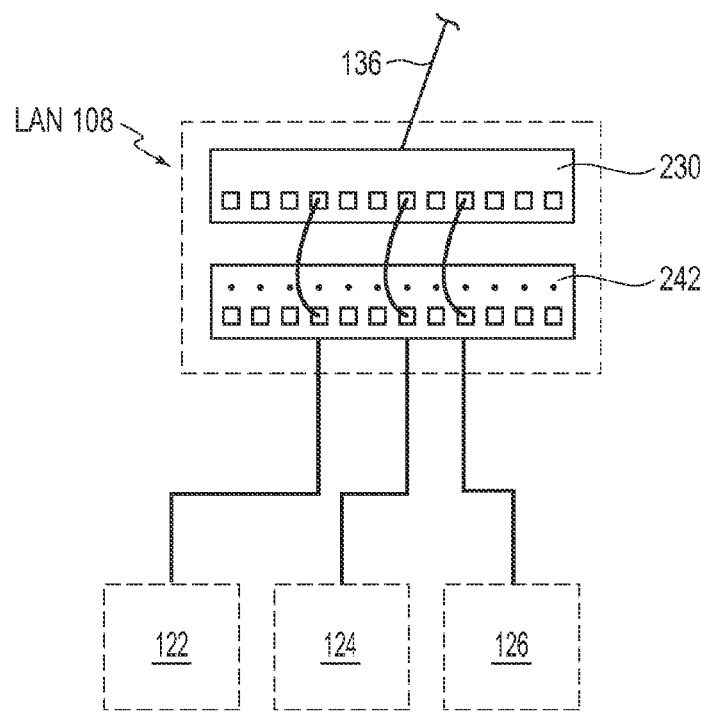
FIG. 4B shows an exemplary PPP LAN interconnect configuration.

FIG. 4B shows an exemplary PPP-based LAN interconnect configuration that supports PoN service. As shown in FIG. 4B, using LAN 108 as an example, end-user devices 122-126 may be directly or indirectly connected to a PPP 242 via horizontal cabling and punch-down blocks (not shown) on the rear face of PPP 242. Connections between switch 230 and PPP 242 may be easily established and/or modified by changing patch cord connections between the front face ports of switch 230 and the front face ports of PPP 242. In an interconnect configuration, as shown in FIG. 4B, technicians responsible for establishing and/or removing and/or changing connections between end-users (via the horizontal cabling plant) and the switch require access to switch 230. Therefore, such a configuration is considered less secure than the equivalent cross-connect configurations shown in FIGS. 4A and 4B. Such an interconnect configuration is typically installed in networks in which securing configuration and security control over switch 230 is not required.

As demonstrated above, the PPP is capable of inserting PoN service into a new or existing LAN by simply being substituted for and replacing a conventional patch panel. As such, the PPP is capable of supporting both cross-connect configurations (as shown in FIG. 4A) and interconnect configurations (as shown in FIG. 4B).

Building horizontal cable plants typically terminate at one or more equipment room patch panels that serve as horizontal cabling demarcation points. Such demarcation patch panels provide a clean physical termination of the horizontal cable plant cables. In addition, a patch panel-based demarcation point allows the respective network cables within the horizontal cable plant to be easily tested for TIA category 5e and 6 compliance and certified as compliant prior to hand-off of responsibility for the horizontal cable plant from, for example, a cable installer to, for example, the network engineers responsible for connecting equipment to the horizontal cable plant. Under current industry practices, the rear punch-down blocks of a patch panel are considered to be a sufficiently reliable and stable termination point for a horizontal network cable. However, under current industry standards, RJ-45 jacks on the front face of a hub are not considered a sufficiently reliable and stable termination point for a horizontal network cable.

Accordingly, although the PPP is capable of supporting both cross-connect configurations and interconnect configurations, a power hub is only capable of supporting a cross-connect configuration. Further, use of PPP 242 in a cross-connect configuration (e.g., by replacing patch panel 232 or patch panel 234 in FIG. 3A) allows PoE service to be introduced to an existing cross-connect configuration without adversely impacting equipment rack and existing cable plant/facility layouts. Use of PPP 242 in a cross-connect configuration (e.g., by replacing power hub 233 in FIG. 3B) allows PoE service to be maintained and results in a rack space savings for each power hub replaced with a PPP. Use of PPP 242 in an interconnect configuration (as shown in FIG. 4B) to replace an existing or planned cross-connect configuration results in an overall space savings of nearly 50% over an equivalent cross-connect configuration. This savings may be significant to rack space management when upgrading non-powered networks to PoE networks. Additionally, the interconnect configuration eliminates the need for patch cords between a power hub and a conventional patch panel, thereby reducing the number of cables required, reducing cable congestion within LAN equipment rooms, and reducing the likelihood of cable-related network connection faults.

The power hub, on the other hand, as addressed above, cannot be substituted within an existing cross-connect configuration without adversely affecting existing facility equipment rack space requirements and in some cases may adversely affect equipment room equipment rack counts, facility layouts, and cable plant layouts. Further, for reasons addressed above, a power hub is not capable of supporting an interconnect configuration and, therefore, does not allow facilities to capitalize upon the space savings that can be achieved by using an interconnect configuration in those facilities for which an interconnect configuration is acceptable.

In summary, regardless of whether an existing equipment room is configured in a cross-connect or interconnect configuration, PoE may be inserted using a PPP-based approach without impacting equipment room space requirements. The PPP approach may avoid significant infrastructure planning and/or infrastructure upgrades that may be associated with a power hub-based approach.

An exemplary NMS is described in U.S. patent application Ser. No. 11/209,817, filed on Aug. 24, 2005 and entitled "SYSTEMS AND METHODS FOR NETWORK MANAGEMENT," which is hereby incorporated by reference in its entirety including all references cited therein. An EMS may be an NMS that is tailored to provide at least a subset of NMS features, but may include all the features of an NMS. The EMS may be configured to meet the needs of a specific set of intelligent network devices.

The NMS/EMS such as NMS 110 and EMSs 112-114 (FIG. 1) may maintain a database of device information that may be retrieved from intelligent network devices (e.g., PPPs) through network system 100. The NMS/EMS may further maintain within its database logical and physical topology information that describes the connectivity of devices within network system 100. Physical topology information may include unique identifiers for each network device, physical locations of network devices such as building/floor/room number identifier, rack identification, position in the identified rack, horizontal cabling work area identification, and position relative to equipment racks, PPPs, PPP ports, PPP power sources, etc. Logical topology information may include network device connectivity such as PPP identification, PPP port number, jack identification, horizontal cable and work area jack identification, power source identification, etc. The database may also contain key cable performance measurements.

The PPP may serve as the primary repository of physical location information relative to the location of the PPP and the location of work areas supported by each of the ports within the PPP. For example, at the time of installation, a PPP may be configured with logical and physical location information (e.g., building, floor, room, GPS coordinates, IP address, IP mask, default IP gateway, etc.). The PPP may provide such information to the NMS/EMS, thus assuring that the logical and physical location information stored within the NMS/EMS is consistent with the actual network status. Further, at the time that each PPP port is wired via a punch-down block to an incoming cable, the location served by that cable may be entered into the PPP. For example, if the PPP is configured as a horizontal cabling demarcation patch panel, information such as the work area supported by the cable (e.g., building/floor/work area/wall jack, etc.) may be entered into the PPP and stored in a non-volatile memory. If the PPP is configured as a switch patch panel interface, information relating to the switch port supported by the cable (e.g., building/floor/equipment room/switched/port, etc.) may be entered and stored in the PPP. Such location information may be stored in a data structure specified by a definition interface file (DIF). In Simple Network Management Protocol (SNMP), a DIF corresponds to a Management Information Base (MIB). When the NMS/EMS requests information stored within a PPP's DIF data structure, the PPP may respond to the request by transmitting data stored within the data structure to the NMS/EMS, which may store the data within corresponding data structures in the NMS/EMS. For example, the NMS/EMS may have a DIF with data structures that include data structures that are identical to data structures defined by the PPP DIF so that information in a PPP's data structure may be retrieved and stored within a corresponding data structure within the NMS/EMS.

Further, the NMS/EMS may send PPP control parameters to control the PPP. The control parameters may be stored according to a DIF common to the PPP and the NMS/EMS so that efficient data transfer may be achieved. Each network device may have a unique DIF. Thus, the NMS/EMS stores all the unique DIFs within the network system 100 or within the subnet that it is configured to control and/or monitor.

Figure 5:
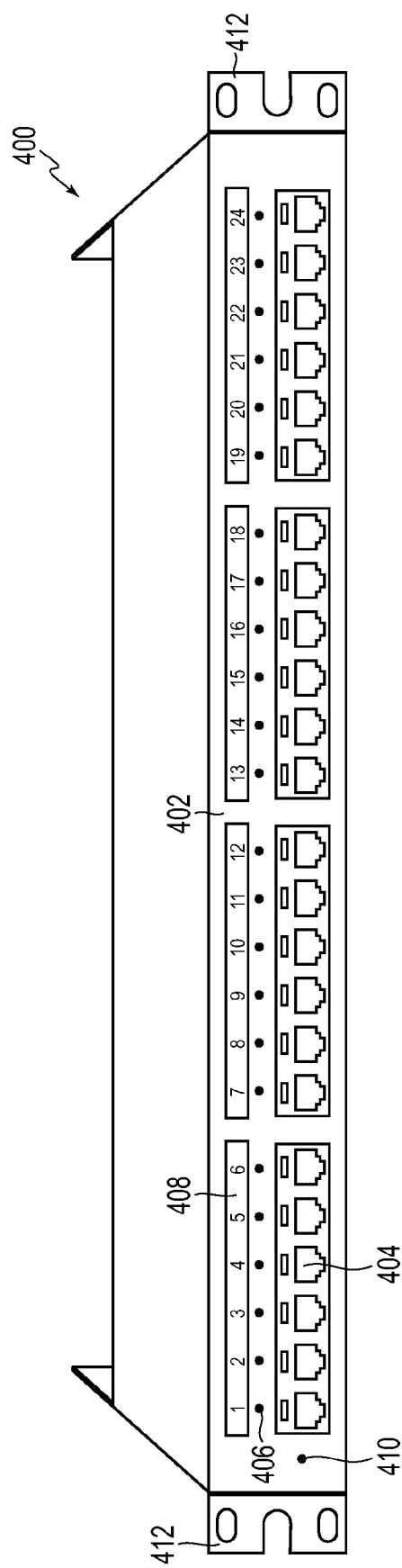
FIG. 5 shows an exemplary front perspective view of a PPP.

FIGS. 5-8 show exemplary configurations of a PPP 400. FIG. 5 shows an exemplary PPP front panel 402 that may include a system status LED 410, a plurality of ports 404, a plurality of port status LEDs 406 where each LED 406 corresponds to one port 404, a plurality of port labels 408, which may be TIA-606-A compliant, and two rack mounting brackets 412 for mounting onto a rack, for example.

Figure 6:
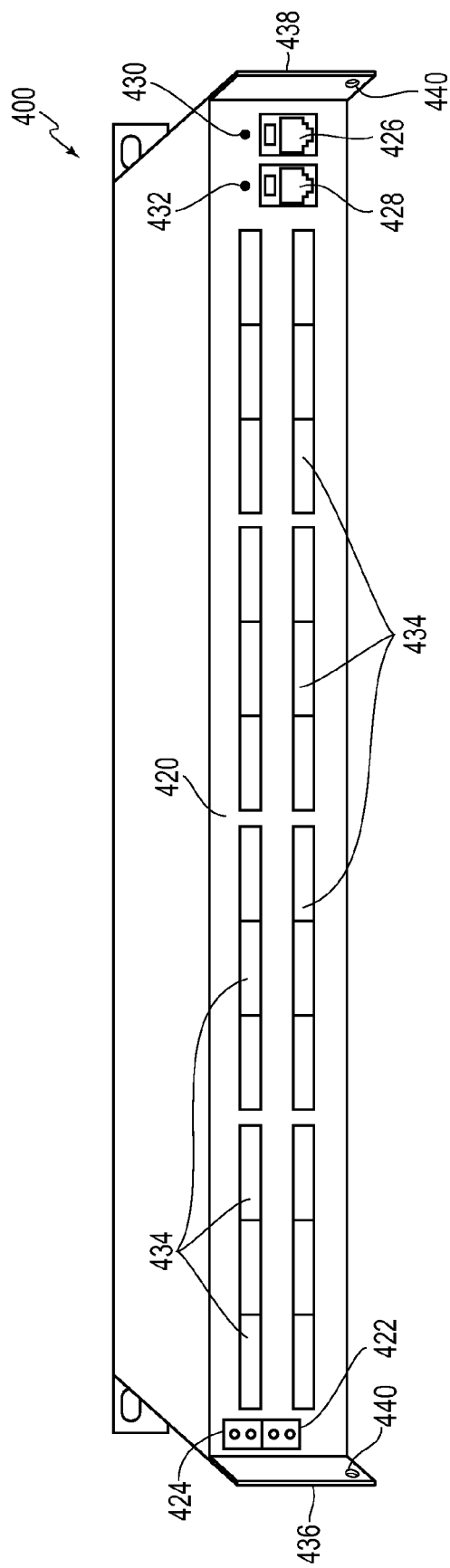
FIG. 6 shown an exemplary rear perspective view of a PPP.

FIG. 6 shows a rear view of an exemplary PPP back panel 420 that may include two power input ports 422 and 424, a network management input port 426, a network management output port 428, two status LEDs 430 and 432 that correspond to the network management input and output ports 426 and 428, respectively, a plurality of punch-down blocks 434 that are grouped into eight groups of three punch-down blocks 434 per group, and a pair of plates 436 and 438 that extend from side panels of PPP 400. Plates 436 and 438 protect punch-down blocks 434 from physical damage. For example, plates 436 and 438 allow PPP 400 to be rested rear face down on a flat surface without damaging punch-down blocks 434.

Figure 7:
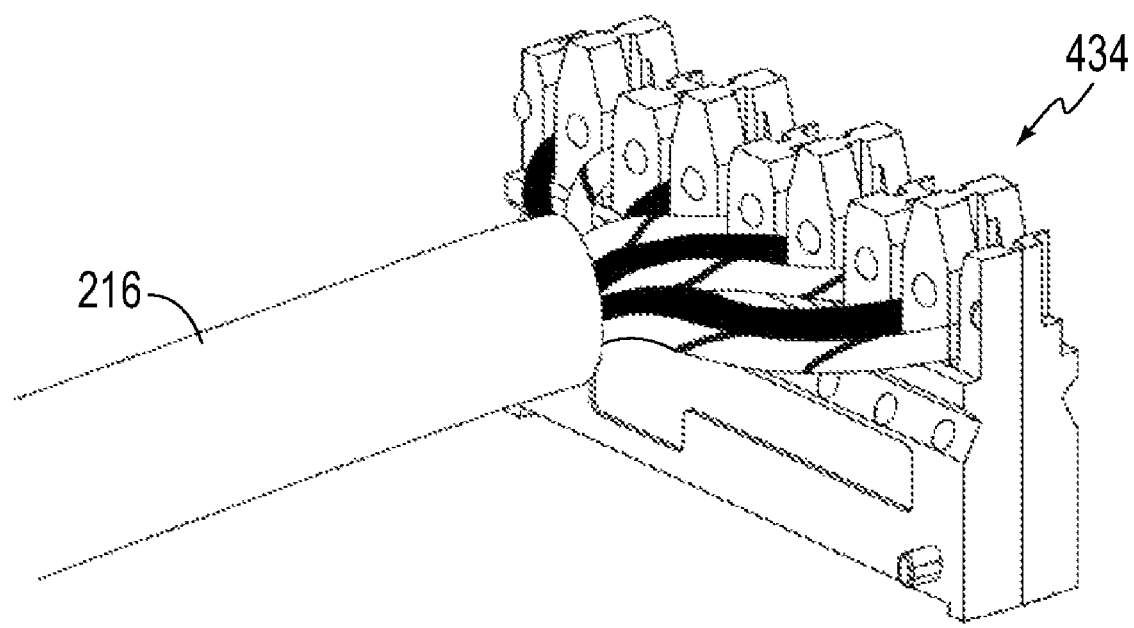
FIG. 7 shows an exemplary perspective view of a punch-down block.

As shown in FIG. 7, punch-down blocks 434 provide wire connections to PPP 400 for cables such as the horizontal cabling 216. Damage to punch-down blocks 434 may render a PPP unusable. Thus, plates 436 and 438 reduce the risk of losing PPP 400 due to damage to punch-down block 434.

Figure 8:
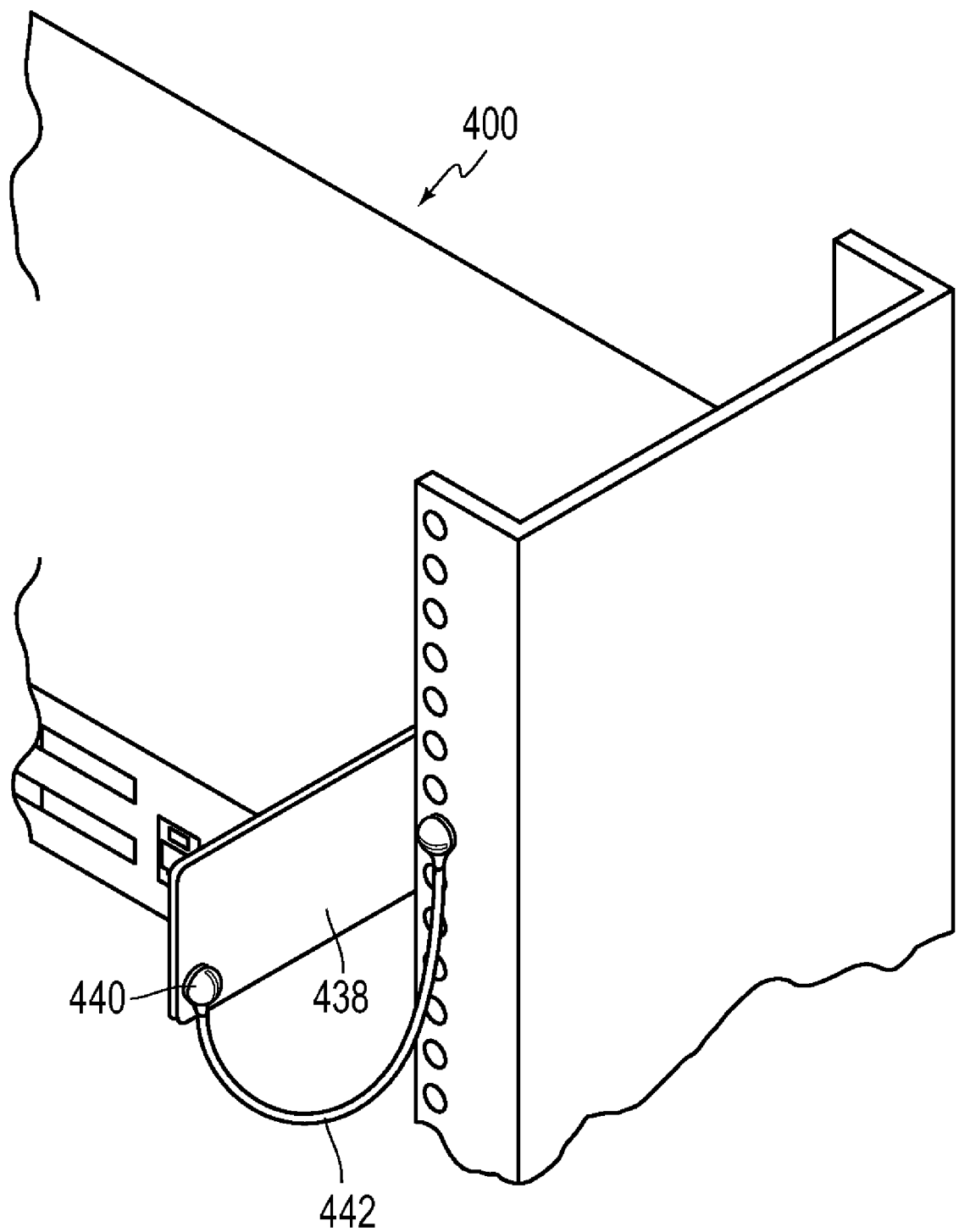
FIG. 8 shows an exemplary ground strap.

Each of plates 436 and 438 may include a hole that may serve as a grounding point 440. As shown in FIG. 8, PPP 400 may be securely grounded to a rack by connecting a ground strap 442 between the grounding point 440 and a point on the rack.

Figure 9:
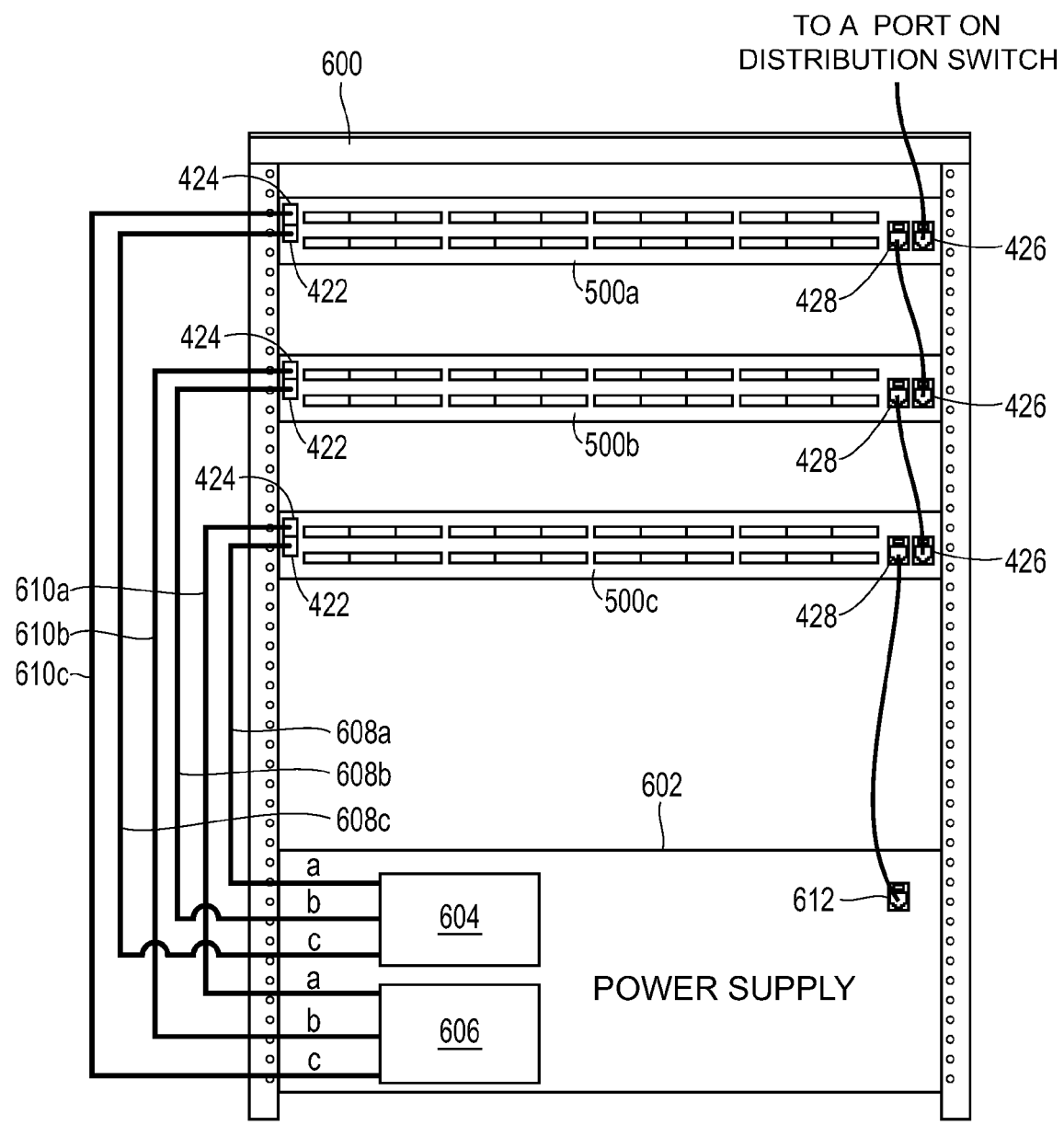
FIG. 9 shows an exemplary rear plan view of three PPPs and a power supply installed within an equipment rack.

FIG. 9 shows an example of three PPPs 500a, 500b, and 500c and a power supply 602 mounted onto a rack 600. Power supply 602 may be a single power supply or may be a combination of multiple power supplies. For example, if power supply 602 includes two power supplies, then each of the power supplies may be independently connected to each of the PPPs 500a-500c in a redundant power supply configuration to provide fault tolerance. Power supply 602 may include power output ports 604a, 604b, and 604c, and, optionally, power output ports 606a, 606b, and 606c if the redundant configuration is implemented. For example, power connections 608a, 608b and 608c may connect power output ports 604a-604c to power input ports 422 of PPPs 500a-500c, and power connections 610a, 610b, and 610c may connect power output ports 606a-606c to power input ports 424 of PPPs 500a-500c if the redundant power supply configuration is used.

Figure 10:
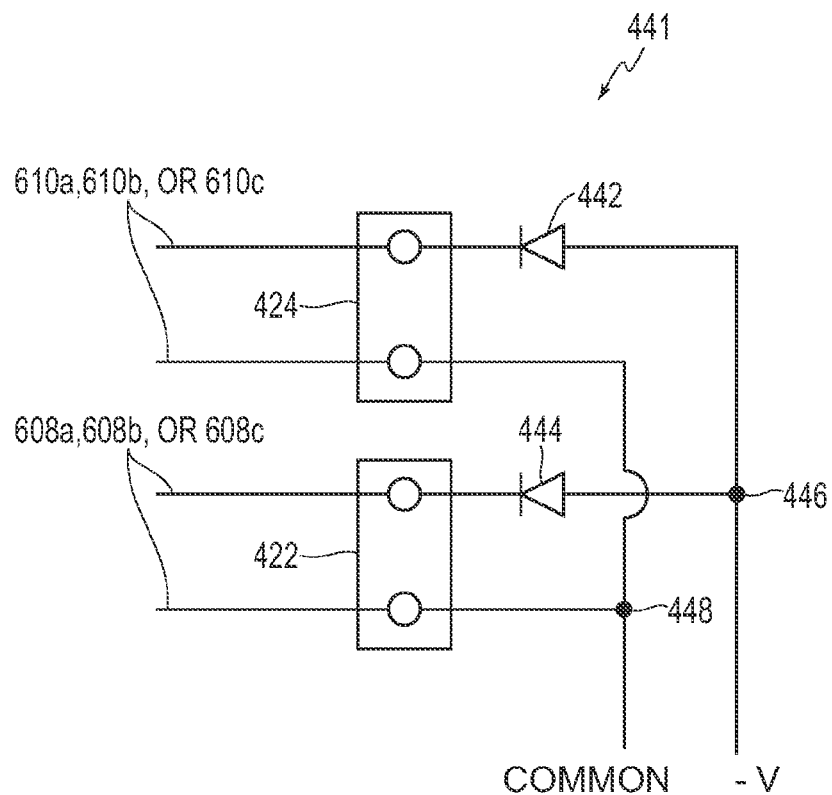
FIG. 10 shows an exemplary PPP input power diode circuit.

FIG. 10 shows a diode "OR" circuit 441 that may be included in each PPP 500a-500c that combines power from two power supplies in a redundant power supply configuration. Power supply 602 may provide DC power having 48 volts, for example, and each of the power connections 608a-608c (or 942 of FIG. 12) and 610a-610c (or 944 of FIG. 12) may include two wires, one positive and one negative. A 48 volt DC power based approach avoids including an internal 110 AC-to-DC power supply, thereby precluding the need for an internal fan in a PPP, so that a PPP may replace, in a one-for-one manner, an existing conventional patch panel. Each of the power input ports 422 and 424 may include two connection points, one positive and one negative, so that the wires of the power connections 608a-608c and 610a-610c connect to corresponding ones of the connection points of the power input ports 422 and 424, positive to positive and negative to negative.

Diode circuit 441 may include two diodes 442 and 444 or equivalent circuitry that models the functions of these diodes. Cathode terminals of diodes 442-444 may be electrically connected to negative connection points of respective power input ports 422 and 424 and anode terminals of diodes 442 and 444 may be electrically connected together at a node 446. Positive connection points may be electrically connected to a node 448. Nodes 446 and 448 provide power to the PPPs 500a-500c. Diodes 442 and 444 prevent power from one of the power supplies from flowing into the other power supply.

Returning to FIG. 9, power supply 602 may include a network port 612 for connection to LAN 108, for example, so that it may be controlled by NMS 110, EMS 112 and/or EMS 114. Network port 612 may be connected to an end of a daisy chain connecting all PPPs 500a-500c of rack 600, for example. FIG. 9 shows network management input port 426 of PPP 500a connected to a port of switch 230 of LAN 108 and network management output port 428 of PPP 500a connected to network management input port 426 of PPP 500b. Network management output port 428 of PPP 500b may be connected to network management input port 426 of PPP 500c, and so on if there are other PPPs on rack 600 until the last PPP of the daisy chain. Network management output port 428 of the last PPP may be connected to network port 612 of power supply 602. In this way, all the PPPs 500a-500c and power supply 602 of rack 600 may connect to the LAN 108 using only one port of switch 230, for example.

Figure 11:
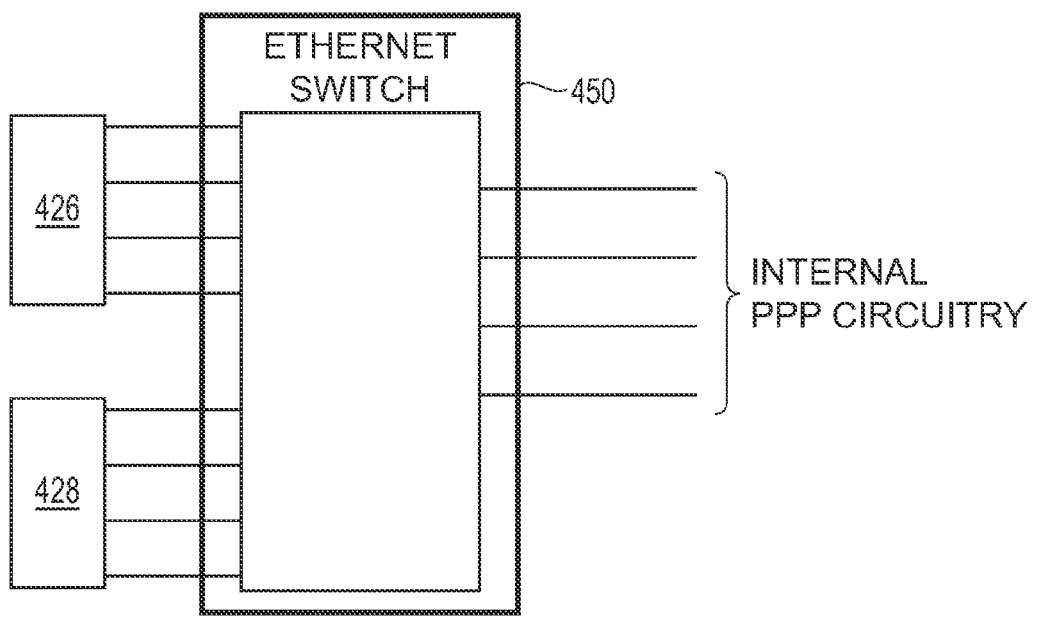
FIG. 11 shows an exemplary PPP internal Ethernet switch.

FIG. 11 shows a PPP internal Ethernet switch 450 that supports daisy chaining of network management input and output ports 426 and 428 and interface with internal PPP circuitry. The status of the network management input and output ports 426 and 428 may be indicated by status LEDs 430 and 432, respectively (as shown in FIG. 6). Table 1 below shows example indications of status LEDs and corresponding conditions associated with network management input and output ports 426 and 428.

TABLE 1

Network Status LED Indications

| LED Color | Network LED Status | Description | Notes |
| --- | --- | --- | --- |
| Off | Off | No connection to the NMS/EMS. | If the system is otherwise operating normally and an Ethernet cable is connected, this could be an issue with the panel's management interface. |
| Green | Flashing | The management link on the PPP is configured correctly and communication messages are currently being processed. | Normal operation. |
| Green | Solid | The management link on the PPP is configured correctly, but no communication messages are currently being processed (i.e., the link is idle). | Normal operation. |
| Amber | Solid | The PPP is currently trying to acquire DHCP address information from the network. | If this persists for more than a minute or two, the daisy chain of connections between multiple PPPs may be incorrect or there are problems at the DHCP server. |

Figure 12:
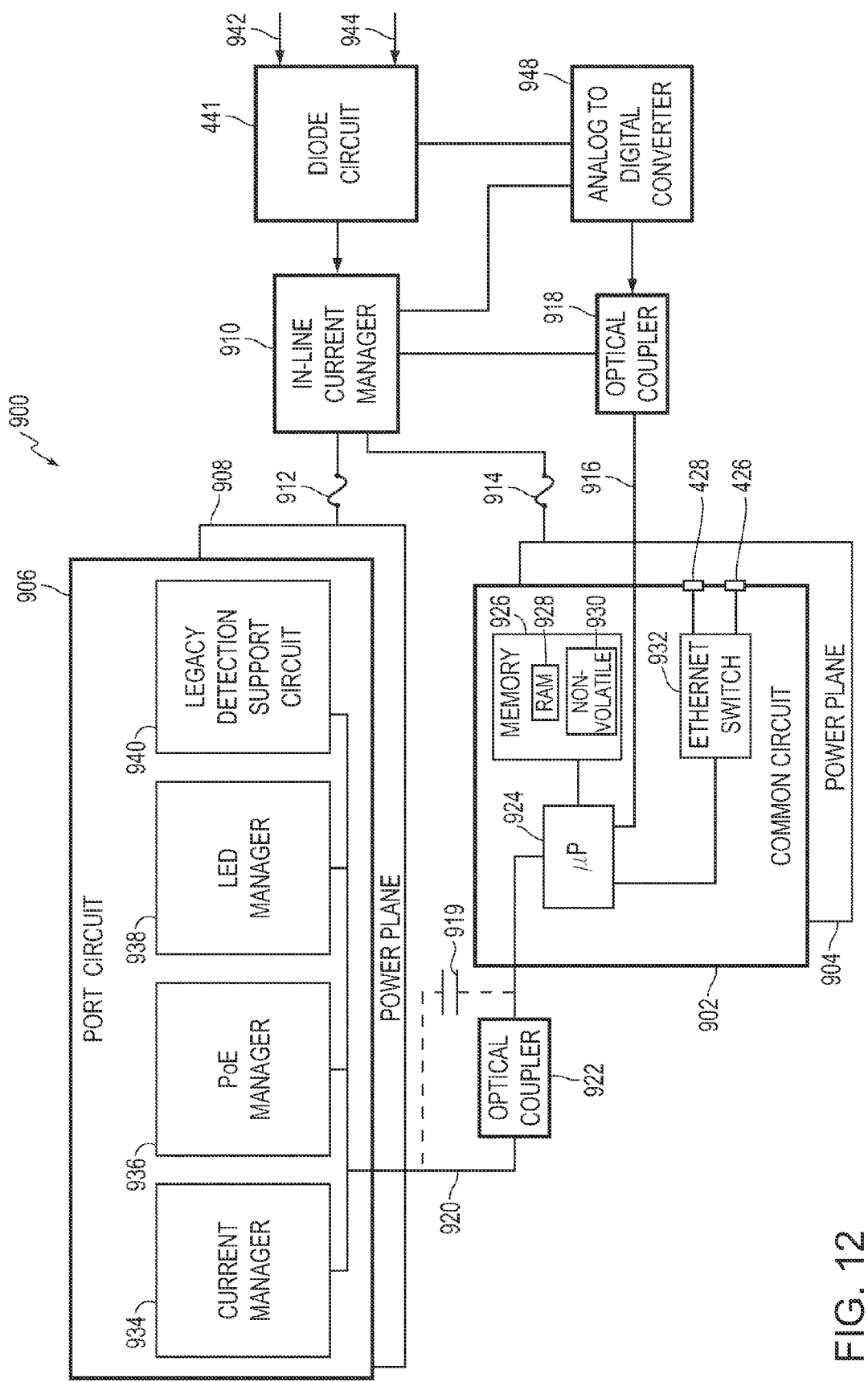
FIG. 12 shows an exemplary hardware block diagram of a PPP.

FIG. 12 shows a block diagram of circuitry in an exemplary PPP 900 that includes diode circuit 441, an in-line current manager 910, an analog-to-digital converter 948, power-planes 904 and 908, a common circuit 902 and a port circuit 906. Assuming that two power supplies are used to provide fault tolerance, analog-to-digital converter 948 may monitor voltages of the two power supplies, nodes of diode circuit 441, and output voltages generated by in-line current manager 910, and provide digital values of the monitored voltages to processor 924 of common circuit 902 via optical coupler 918 (also called optical isolator). Processor 924 may also receive a value of current passing through in-line current manager 910. These voltage and current values may be processed by processor 924 for processes such as:

1. determining an input power consumption for the PPP;
2. calculating threshold values for low current and high current conditions based upon past and current use;
3. generating an event notification to NMS 110, EMS 112 and/or EMS 114 containing voltage, current and calculated power measurements;
4. generating an event notification to NMS 110, EMS 112 and/or EMS 114 when voltage values monitored in diode circuit 441 are below or above predetermined thresholds;
5. generating an event notification to NMS 110, EMS 112 and/or EMS 114 when the current passing through in-line current manager 910 is below or above predetermined thresholds; and
6. generating event notification to NMS 110, EMS 112 and/or EMS 114 when the power consumption of the PPP is below or above predetermined thresholds.

These and other event notifications may be logged by NMS 110, EMS 112 and/or EMS 114 by storing data associated with the event notification, for example. An operator may view the logged event notifications on a per-port or per-PPP basis using a GUI for maintaining network system 100.

As shown in FIG. 12, in-line current manager 910 separately outputs current-managed power to common circuit 902 and port circuit 906 via separately fused (by fuses 912 and 914, respectively) power-planes 904 and 908. Signal lines between in-line current manager 910, common circuit 902 and port circuit 906 are isolated by optical couplers 918 and 922 and/or capacitive coupling 919. In this manner, power failure in one of the power-planes 904 and 908 may be prevented from affecting power supplied to the other plane 904 or 908. Thus, operation of the common circuit 902 may continue if power to power-plane 908 of port circuit 906 fails, or operation of port circuit 906 may continue if power to power-plane 904 of common circuit 902 fails.

For example, damage to port circuit 906 due to an accidental connection of a high voltage source to a cable connected to a PPP port could be prevented from affecting operations of common circuit 902. Thus, common circuit 902 may continue to communicate with NMS 110, EMS 112 and/or EMS 114 such as reporting status despite failure of port circuit 906. Damage to common circuit 902 would be similarly prevented from affecting operations of port circuit 906. Thus, PoE service may continue to be supplied to the PPP ports despite damage to common circuit 902.

PPP embodiments may include any number of port circuits 906. Each port circuit 906 may receive power from an isolated power plane 908 and each port circuit 906 may support a designated number of ports, as described herein. In this manner, an individual port circuit 906 may fail (e.g., due to a power surge or some other cause) and the remaining port circuits 906 may continue to operate normally.

Processor 924 may control system status LED 410 to indicate various PPP conditions as discussed above. Additionally, conditions such as listed below may be indicated by system status LED states:

1. DHCP addressing (dynamic address);
2. power supply noise out-of-limit;
3. firmware update;
4. firmware compatibility;
5. loss of power for a power-plane which may indicate conditions such as a blown fuse;
6. input power not received;
7. processor initializing;
8. port circuit working properly; and
9. port circuit failed but common circuit working properly.

LED states such as single or multiple colors and toggling between colors, sequencing LED colors or blink rates, coded pulsing, and/or intensity variations may be used for indications of particular PPP conditions. Additionally, a blinking rate may be used instead of setting the LED to an on state to save power. Table 2 below shows other examples of possible system status LED states for different conditions of PPP 900.

TABLE 2

PPP System Status LED Indications

| LED Color | LED Status | Description | Status of Power Ports |
|---|---|---|---|
| Off | Off | No Power is being supplied to the PPP. | Power is NOT being delivered to the ports on the PPP. |
| Green | Flashing | System operating normally. | Power is being delivered down the ports on the PPP, as configured. |
| Amber | Solid | Out of voltage range condition. Less than 46 VDC or more than 57 VDC is being supplied to the PPP. | Power may or may not be delivered to any ports on the PPP. |
| Red | Solid | The main processor on the PPP is NOT operating properly and power is NOT being delivered to any ports on the PPP. | Power may or may not be delivered to any ports on the PPP. |

As shown in FIG. 12, port circuit 906 may include a current manager 934, a PoE manager 936, an LED manager 938, and a legacy detection support circuit 940 for each port of PPP 900. Current manager 934 may include control logic such as a state machine that may control and monitor current flowing via each port to a connected end-user device. For example, current manager 934 may include current limiting circuitry that limits current flow based on values set in a register.

Figure 13:
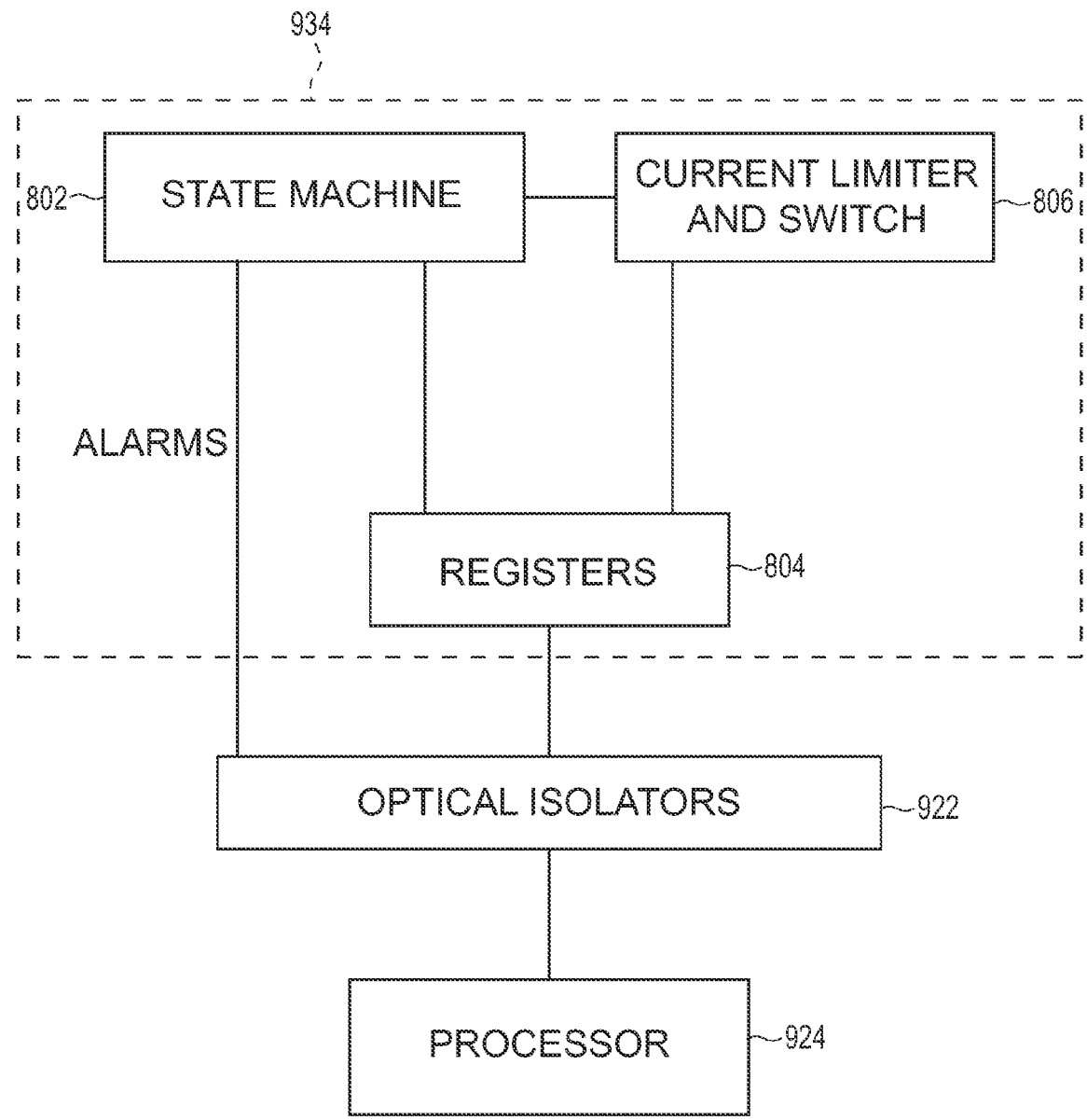
FIG. 13 shows an exemplary block diagram of a current manager.

FIG. 13 shows an example of current manager 934 that includes a state machine 802, a registers 804, and a current limiter and switch 806. Processor 924 may set control values in registers 804. State machine 802 may control current limiter and switch 806 based on the values in registers 804. For example, processor 924 may define thresholds in registers 804. A first threshold may be an absolute current limit and a second threshold may set a current limit that may be exceeded for a first controlled period of time. When a port has exceeded the first threshold, state machine 802 may immediately command the current limiter and switch 806 to stop supplying current by opening a switch, for example. Additionally, the state machine 802 may update values in registers 804 (change state) and generate an alarm signal (an event) to processor 924 to indicate that the first threshold has been exceeded for the associated port.

When the second threshold is exceeded, state machine 802 may change state by updating registers 804 to set off a timer. If the current falls below the second threshold before the timer expires, then state machine 802 may return to its earlier state; otherwise, state machine 802 may enter a third state and switch off the port for a second control period of time before turning the port on again. State machine 802 may also set values in registers 804 to record a number of times the second threshold has been exceeded, for example, so that processor 924 may retrieve the values in registers 804 for reporting to NMS 110, EMS 112, and/or EMS 114.

Processor 924 may monitor the current value measured by in-line current manager 910 over time (historical power use). Processor 924 may periodically use these measurements to calculate new current thresholds for use in monitoring current flow to PPP 900. Current thresholds based on the historical power use may be better indictors of abnormal current use.

Figure 14:
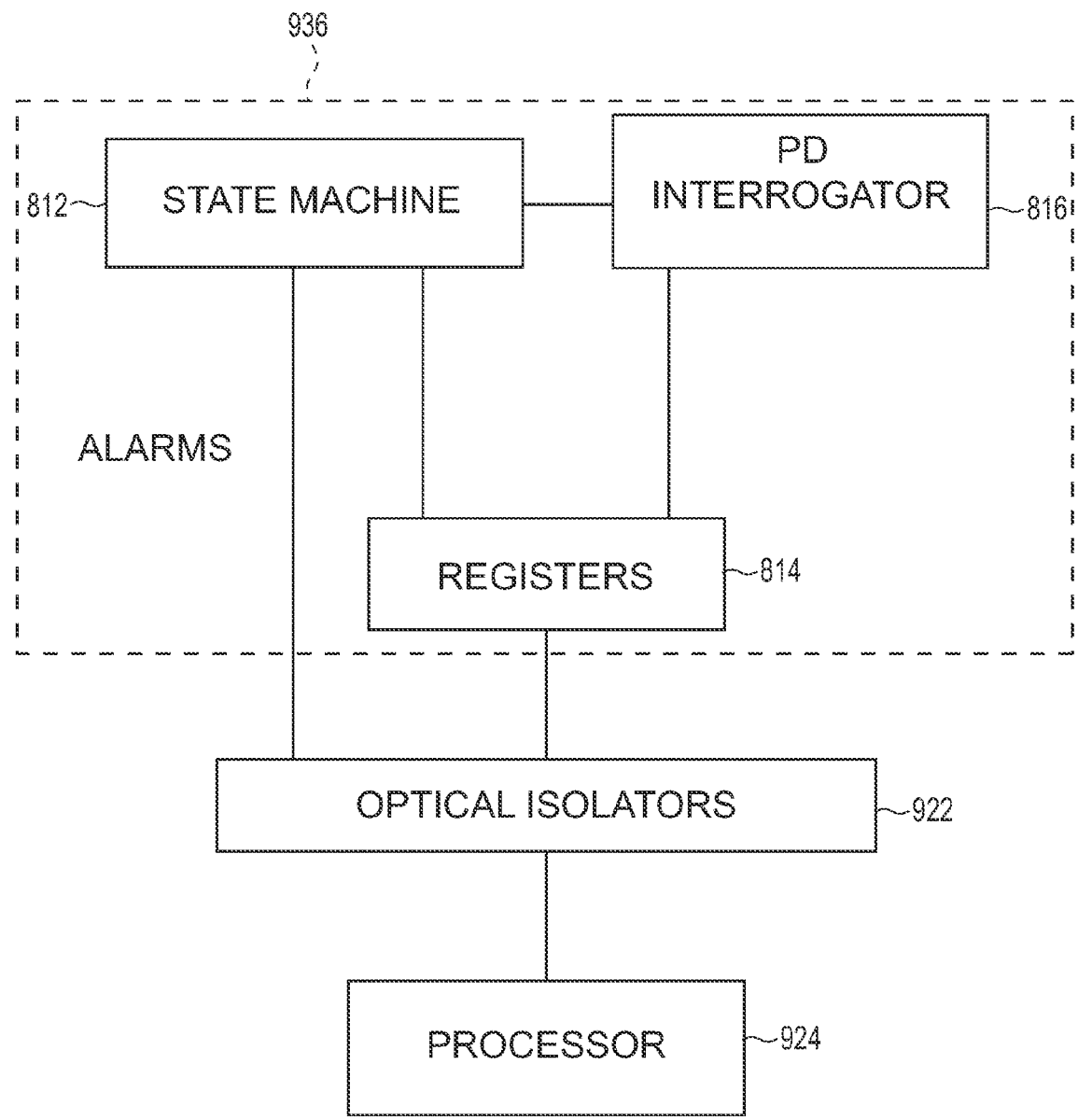
FIG. 14 shows an exemplary block diagram of a PoE manager.

PoE manager 936 monitors each PPP port to detect the presence and characteristics of a PoE powered device (PD). As shown in FIG. 14, PoE manager 936 may include control logic such as a state machine 812, registers 814, and a PD interrogator 816. Any number of state machines 812, registers 814, and PD interrogators 816 may be used, as may be dictated by implementation requirements, for example. If a PoE PD is detected, state machine 812 may change state by updating registers 814 and proceed to determine the PoE class of the PoE PD (classification). Once the class is determined, PoE manager 936 provides power to the PD based upon the PD's PoE class such as defined in IEEE 802.3af, for example. PoE manager 936 may also perform functions such as:

1. determining which Ethernet cable pairs to distribute PoE power over;
2. controlling the types of PoE equipment to be detected (i.e., IEEE 802.3af equipment only, legacy equipment and/or other variations);
3. activating or deactivating PoE service on a per-port basis;
4. setting PD PoE priority and/or maximum power level, on a per-port basis;
5. controlling PoE priority on a per-port basis by setting a control parameter that controls port power priority to one of critical, high and low. In a low power event, PDs with higher power priorities should be disconnected only after power has been disconnected to ports with a lower power priority;
6. controlling PoE detection techniques on a per-port basis; and 7. controlling PoE PD power classification on a per-port basis. PD power classification indicates an amount of power the PD may be expected to consume.

State machine 812 may be controlled by control parameters stored by processor 924 in registers 814. For example, processor 924 may force a port to stop supplying power by setting a "stop bit" in registers 814. The "stop bit" may change the state of state machine 814 which may respond by opening a switch disconnecting power to the PD, for example. State machine 812 may report port status changes to processor 924 by sending one or more alert messages (events) to processor 924 or by updating registers 814 with new status information. Processor 924 may obtain the status information by reading the contents of registers 814.

Status updates provided by PoE Manager 936 to processor 924 may indicate conditions such as:
1. no PD is attached to the PPP port;
2. no power is being delivered over a PPP port;
3. power is being delivered over a PPP port; and
4. a PD has been detected but its power requirements cannot be determined.

Processor 924 may relay such status updates from PoE manager 936 via an event notification to NMS 110, EMS 112, and/or EMS 114. In this manner, NMS 110, EMS 112, and/or EMS 114 may maintain accurate port-level connection and PoE-related information.

Figure 15:
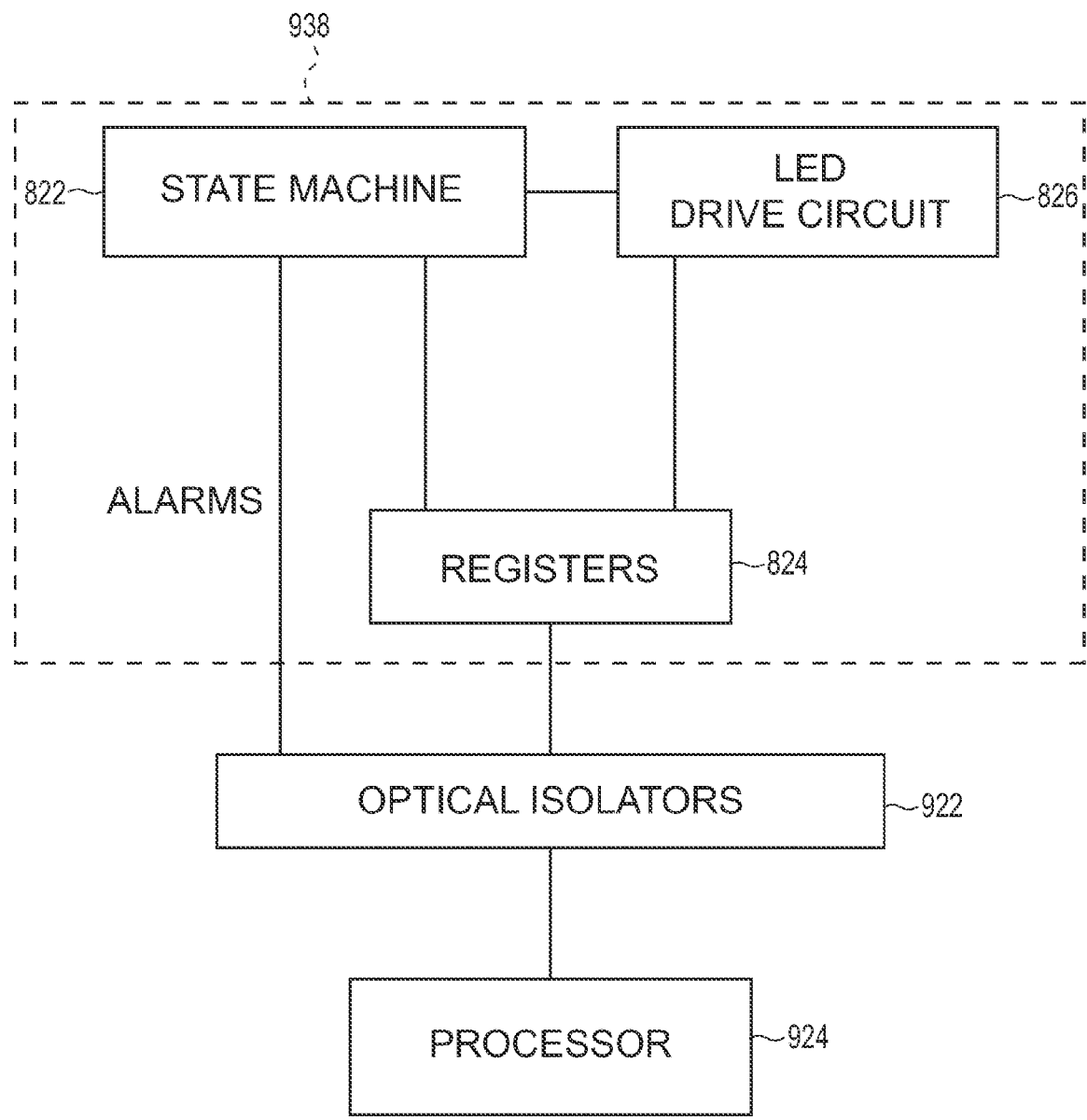
FIG. 15 shows an exemplary block diagram of an LED manager.

LED manager 938 controls port LEDs 406 and may include control logic such as a state machine 822, a registers 824, and an LED drive circuit 826, as shown in FIG. 15. State machine 822 controls LED drive circuit 826 based on values in registers 824 which may be set by processor 924. For example, processor 924 may force LED 406 of a specific port to blink at a specified rate by setting values in registers 824 in response to move/add/change requests received from NMS 110, EMS 112, and/or EMS 114. Other LED states such as single or multiple colors, toggling between colors, sequencing LED colors or blink rates, coded pulsing, and/or intensity variations may be used for indications of particular port conditions. State machine 822 may control LED drive circuit 826 based on the values in registers 824 set by processor 924.

State machine 822 may change values in registers 824 based on current LED functions being performed reflecting the status of the associated port so that processor 924 may read the status when performing monitoring functions. Port conditions such as the following may be indicated using LEDs 406:
1. power level indicator for power classification of connected PD;
2. power removed from the port (lockdown), over-current for all ports per classification;
3. over-current conditions for a particular port (administrative restriction);
4. backing off supplying power because connected device is a powered switch;
5. PD voltage incompatibility;
6. port power interface failure;
7. power classification fault; and
8. port power noise outside of limits.

Additionally, LEDs 406 may be used to assist an operator for patch cord tracing and/or direct patch cord removal/change.

Other LED functions may be similarly set by processor 924, such as color, for example. Additionally, state machine 822 may control the LED 406 via LED drive circuit 826 to perform a specific function based on conditions of the associated port. Examples of this type of control are shown in Table 3, below.

TABLE 3

Port Status LED Indications

| LED Color | Port LED Status | Description | Status of Power Ports |
|---|---|---|---|
| Off | Off | No Powered Device (PD) is wired to this particular port on the PPP. | Power is NOT being delivered down this port on the PPP. |
| Amber | Solid | The PPP is determining the PD's power requirements. This occurs for 5 seconds after the PD is connected. | Power is NOT being delivered down this port on the PPP. |
| Green | Solid | Port operating normally. | Power is being delivered down this port on the PPP. |
| Red | Solid | The system has failed to determine the PD power requirements for this port. Perhaps this PD is not an 802.3af compliant or legacy device (e.g., Cisco). It could also be a port configured for 802.3af and an alternate PoE device has been connected. | Power is NOT being delivered down this port on the PPP. |

Figure 16:
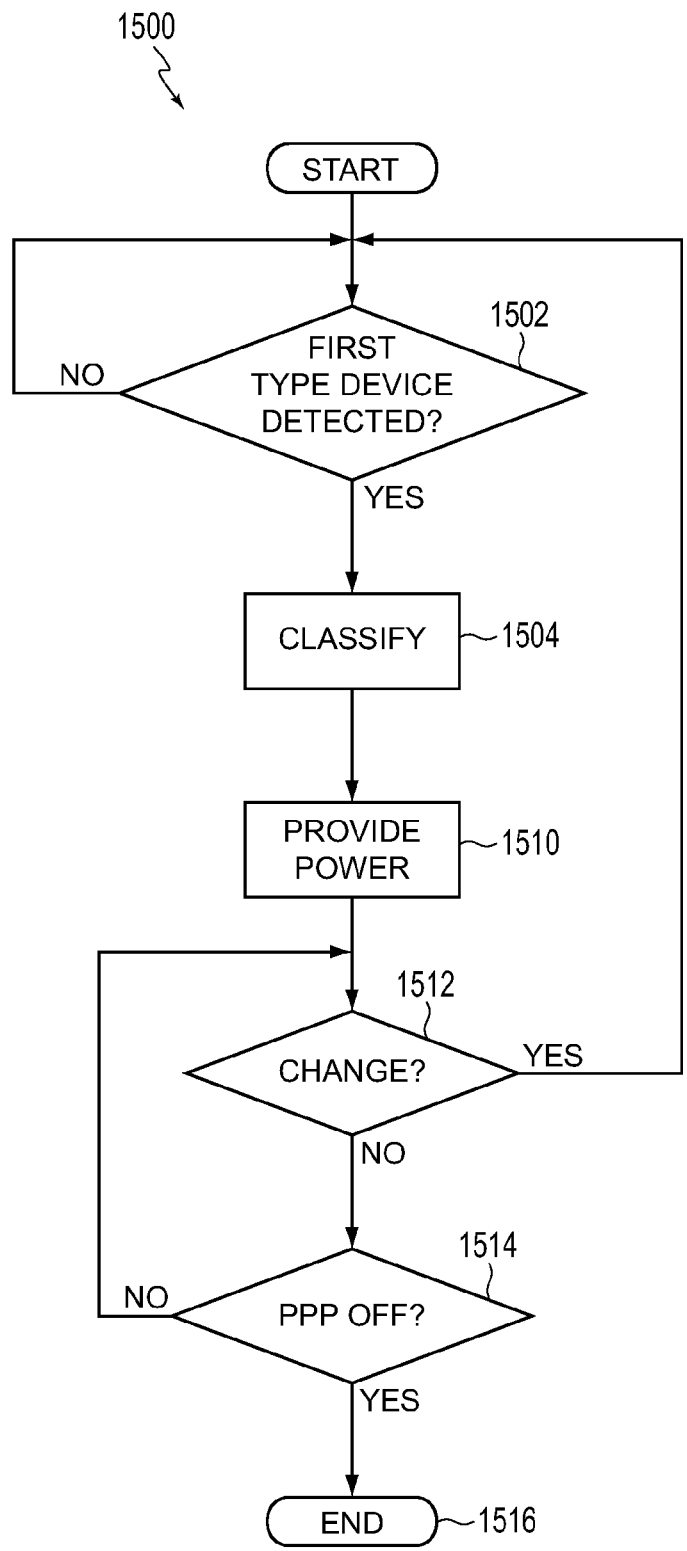
FIG. 16 shows an exemplary PD detection flow chart.

Legacy detection support circuit 940 together with PoE manager 936 and processor 924 executes an exemplary process 1500 shown in FIG. 16 that determines whether an end-user PD connected to a port is a first type of PoE device such as an IEEE 802.3af compatible device or a second type of PoE device such as a legacy device.

In step 1502, the process determines whether a port is connected to a first type PD. For example, if a first type PD is an IEEE 802.3af PoE device, then it may be detected by procedures specified in the IEEE 802.3af standards. If a first type PD is detected, then the process goes to step 1504; otherwise, the detection process, at step 1502, may be repeated after a predetermined delay. In step 1504, the process may classify the PoE PD (determining power requirements by interrogating the PoE device) and the process goes to step 1510. In step 1510, the process may provide power to the PoE PD according to the determined classification, may set the LED associated with the port to a state as specified by contents of registers 824, and may optionally update a state field in registers 824. Next, the process goes to step 1512.

In step 1512, the process determines whether there is a change in the status of the port, e.g., whether the connected PD has been disconnected. If there is a change, the process returns to step 1502; otherwise, the process goes to step 1514. In step 1514, the process determines whether the PPP is turned off. If the PPP is turned off, the process goes to step 1516 and ends; otherwise the process returns to step 1512.

Figure 17:
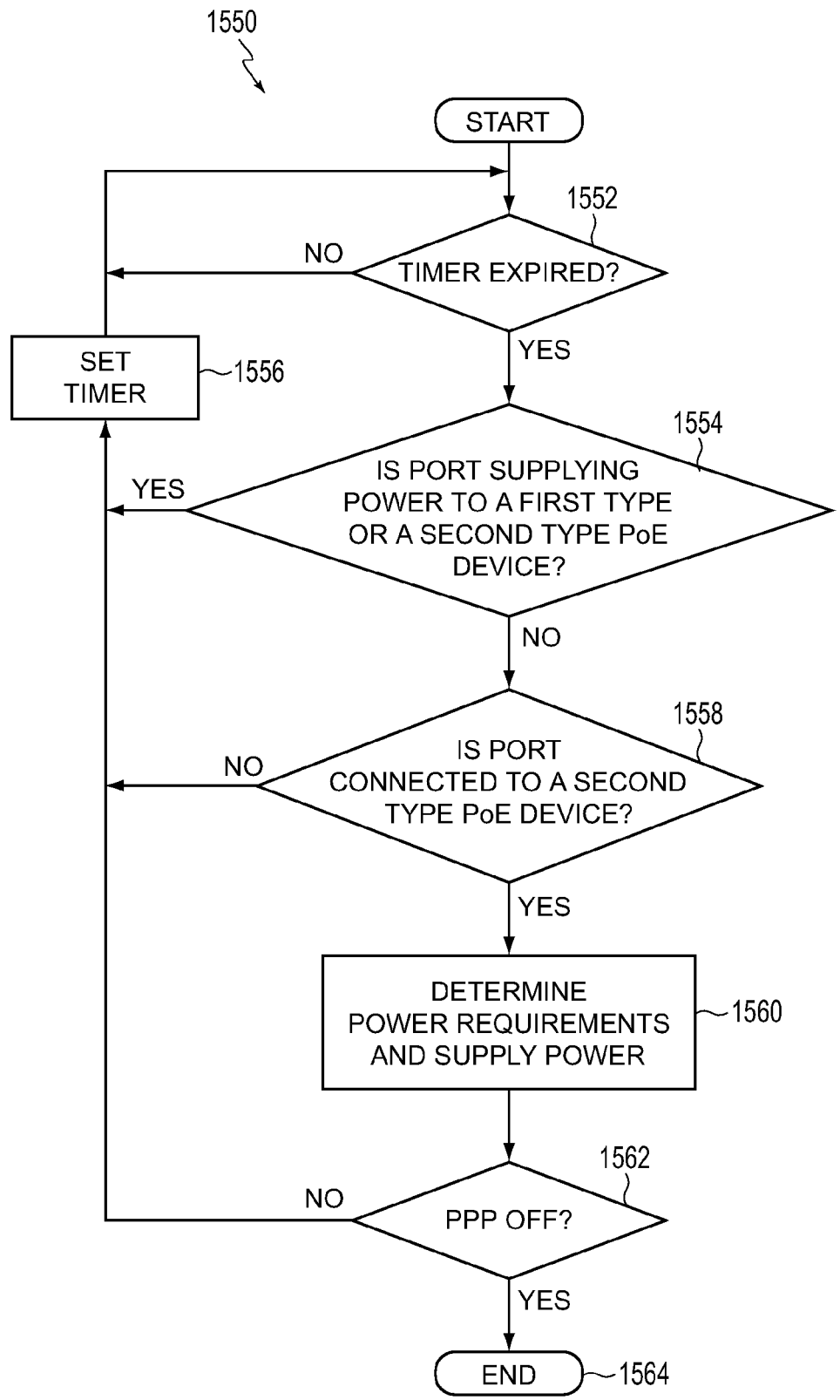
FIG. 17 shows an exemplary legacy device detection flow chart.

While process 1500 is executing, another process 1550, as shown in FIG. 17, may be executing based on a timer to determine whether a first type device is connected. If a first type of device is not connected, the process executes a second type detection process. In step 1552, the process determines whether the timer has expired. If expired, the process goes to step 1554; otherwise, the process returns to step 1552. In step 1554, the process determines whether the port is supplying power to a first type or a second type PoE PD. If the port is supplying power, the process goes to step 1556; otherwise the process goes to step 1558. In step 1556, the timer is set and the process returns to step 1552.

Figure 18A:
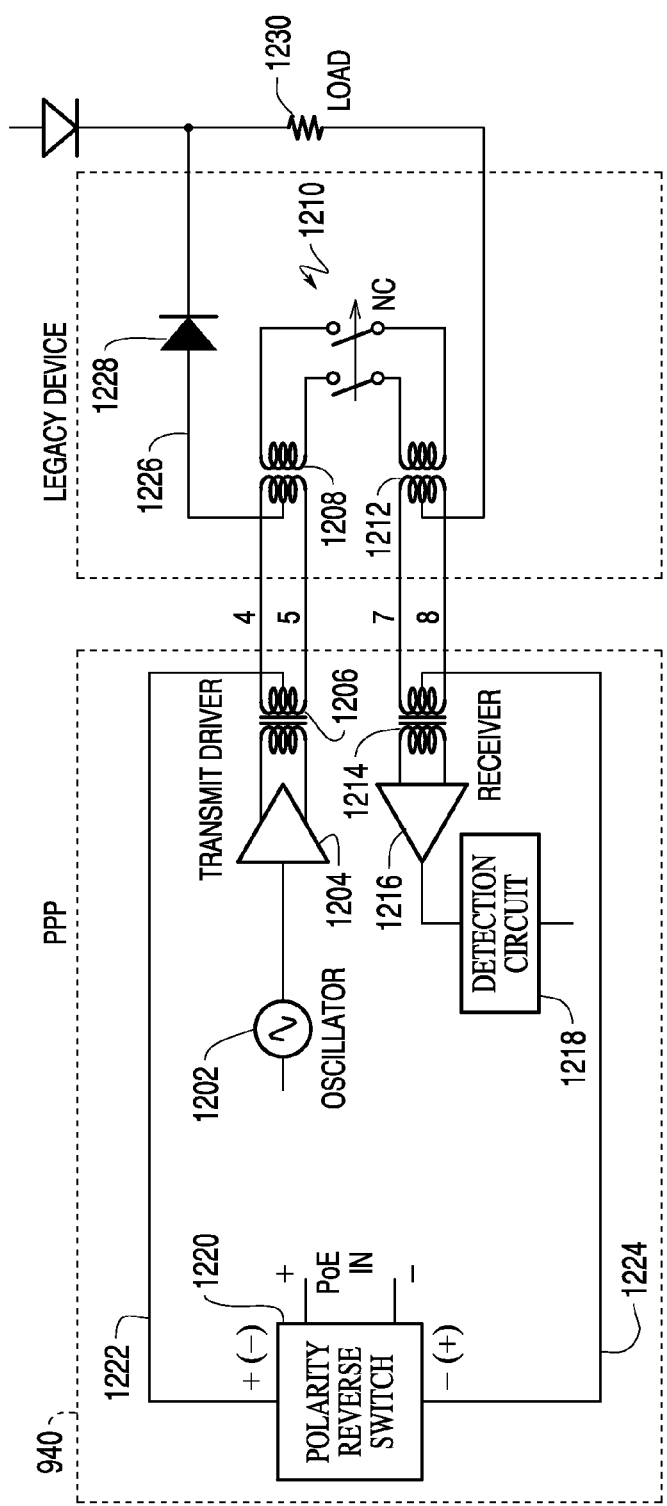
FIG. 18A shows an exemplary legacy powered device detector and connected legacy device.

In step 1558, the process determines whether the port is connected to a second type device such as a legacy device (legacy relative to IEEE 802.3af PoE PDs). An example of how such a determination may be made is shown in FIG. 18A, which shows an exemplary PPP legacy detection support circuit 940 connected via a 4-pair twisted-pair cable to an exemplary legacy PD configured to receive PoN power over wire-pairs 4/5 and 7/8. Legacy detection support circuit 940 may include an oscillating signal generator 1202 that transmits an oscillating signal on wire-pair wires 4, 5 via transmission driver 1204 and transformer 1206.

A legacy PD may be configured such that when a cable is inserted into the PD, physical switch 1210 is moved from an open to a closed position. Therefore, if the PD is a legacy device, the oscillating signal emitted by oscillating signal generator 1202 on wire-pair wires 4, 5 will be transmitted via transformer 1208 and 1212 to wire-pair 7/8, and detected by detection circuit 1218, via receiver 1216 and transformer 1214. If the PD is not a legacy device, physical switch 1210 remains in the open position and detection circuit 1218 does not receive a corresponding signal in response to the oscillating signal output. If no signal is received detection circuit 1218 determines that the PD is not a legacy device.

Figure 18B:
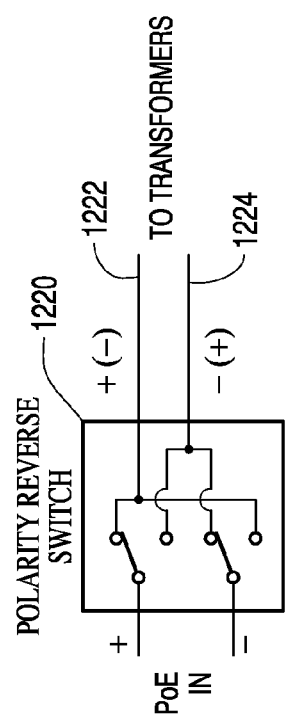
FIG. 18B shows an exemplary polarity reverse switch.

If detection circuit 1218 determines that the connected PD is a legacy device, detection circuit 1218 communicates (via connection lines not shown in FIG. 18A) with polarity reverse switch 1220 to place a negative voltage across leads 1222 and 1224, as shown in FIG. 18B. If detection circuit 1218 determines that the connected PD is not a legacy device, detection circuit 1218 communicates with polarity reverse switch 1220 to place a positive voltage across leads 1222 and 1224. In this manner, an appropriate voltage is placed upon leads 1222 and 1224 and power is transmitted via wiretaps in transformers 1206 and 1214 and via wire-pairs 4/5 and 7/8, respectively, to wire taps on transformers 1208 and 1212 in the PD device. Power received by the PD device at wire taps on transformers 1208 and 1212 is delivered via PD circuit 1226 with diode circuit 1228 to drive PD load 1230.

Returning to FIG. 17, if a second type PoE PD is detected, the process goes to step 1560; otherwise, the process goes to step 1556. In step 1560, the process determines the power requirements of the second type device, provides the required power, and goes to step 1562. In step 1562, the process determines whether the PPP has been turned off. If turned off, the process goes to step 1564 and ends; otherwise, the process goes to step 1556.

The managers within port circuit 906 (i.e., current manager 934, PoE manager 936, and LED manager 938) may operate as independent state machines that interact with processor 924 to receive control parameter updates from processor 924 and to provide status updates to processor 924. As noted above, the port circuit 906 may operate independently of processor 924. For example, in the event that the PPP is powered down, reset or in self-test, either intentionally (e.g., to field-update newly downloaded processor code) or unintentionally (due to a power failure or internal fault-generated reset) port circuit processing may be unaffected and port circuit 906 may continue to support PoE-based services to the PPP ports based on the latest parameters received from processor 924. Once processor 924 is again operational, normal communications between processor 924 and the port circuit 906 may resume.

Returning to FIG. 12, common circuit 902 may include processor 924, a memory 926 which may include random access memory (RAM) 928 and non-volatile memory 930, and a two-port Ethernet switch 932. If PPP control parameters and configuration data such as location and connection information and associated DIFs are stored in non-volatile memory 930, PPP 900 may return to the stored PPP configuration if power was accidentally lost causing PPP 900 to restart, for example. Control and configuration parameters that may be stored in non-volatile memory 930 may include:

1. PPP configuration parameters;
2. PPP and PoE-related current and voltage thresholds;
3. PPP network IP configuration data;
4. event notification (e.g., SNMP trap) recipients; and
5. PPP identity, PPP physical location information and associated power supply identification and location information.

Processor 924 may control operations of PPP 900 based on control parameters and data stored in memory 926, and may communicate with other devices via Ethernet switch 932. Memory 926 may be used to store software that may be executed by processor 924. Processor 924 may control port circuit 906 to perform its functions by setting the registers 804, 814, and 824 based on received control parameters. Additionally, processor 924 may perform the following functions:

1. controlling a port based on whether the PoE PD may receive AC/DC PoE detection or DC only detection;
2. controlling whether control/administration of port-level values by an NMS/EMS may be accepted by the PPP; and
3. controlling whether wire assignments for transmitting power may be changed.

NMS 110, EMS 112, and EMS 114 may interface with a GUI that permits an operator to maintain and control the network and administer desired policies. For example, such a GUI may permit the operator to graphically view monitored power and one or more failure statuses of devices such as PPPs and devices connected to the PPPs.

The GUI may provide a graphical display of the topology of network system 100 which may be organized into trees, and each branch of the tree may form a sub-network (subnet) of network system 100. The GUI may display a subnet in relation to actual physical locations such as, for example, a floor plan detailing physical aspects of the building where PPPs may be disposed, such as equipment closet 206 and racks 600. The GUI may provide displays such as:

1. a hierarchical view of all PPPs;
2. a listing of PPPs;
3. information for each PPP of a selected rack including logged event notifications; and
4. detailed configuration, control and status information for a specifically selected PPP, including:
    a. a message log of event notifications generated by the PPP;
    b. current and historical power usage values for each PPP; and
    c. physical location and logical connection information.

The GUI may provide capabilities to support functions such as searching for panels of a selected subnet across a range of IP addresses, viewing and/or changing information on a per-port basis of each PPP, etc.

The network topology may be derived from PPPs by either explicitly requesting needed information or receiving unsolicited notifications from PPPs resulting from local monitoring functions. For example, data that may be received from PPPs may include:

1. physical location information such as room identification, rack identification, horizontal cabling work room identification;
2. connection information such as PPP and port identification, switch port identification, power supply source identification;
3. whether or not powered devices are connected to a port;

4. an amount of current consumption. This is especially relevant to intelligent network devices such as a PPP because PPPs supply power to their ports and the total amount of power supplied through a PPP may be monitored for network power budget purposes;
5. information (e.g., a PD identifier and/or a PPP port identifier) related to an abnormal termination of power to a powered PD and which, based upon the PPP's PD interrogation techniques, appears to have been disconnected;
6. non-compliant PDs such as PDs whose power consumption is over specified limits;
7. PPP power consumption has dropped below a threshold;
8. PPP power consumption has exceeded a threshold;
9. PPP physical location has been changed;
10. PPP incoming voltage is outside desired range (e.g., too high or too low);
11. PPP power fuse has blown;
12. the amount of incoming power to a PPP;
13. PPP-detected management port connections; and
14. PPP-detected management port disconnections.

An operator may use the GUI to control network system 100 by setting various parameters of PPPs. For example, an operator may:

1. perform maintenance by monitoring any PPPs (e.g., verify port connections by sending test signals, confirm connection to a PPP, etc.);
2. designate priority for output power for any port of a PPP. For example, a port may be designated as low, high or critical priority;
3. set thresholds for power consumption for a PPP or any of its ports. For example, such thresholds may be set in the form of current and/or voltage values;
4. perform real-time monitoring and setting thresholds of current and voltage of power inputs for a PPP, for example. Thresholds may be set for detection of alarm conditions;
5. monitor a parameter, such as a voltage or current, of a first power supply, a parameter of a second power supply and a parameter at a summation point when a PPP is supplied by two power supplies, for example;
6. command outputting full power for all ports of a PPP;
7. detect and display power consumption for a PPP or one or more ports of the PPP;
8. assign dynamic (DHCP) or static IP address to a PPP at installation, for example;
9. selectively deactivate/re-activate power service to a PPP port;
10. control operation of LEDs of a PPP (e.g., blinking rate, on/off, etc.); and
11. assign power mode (e.g., normal, forced or forced with device check) for each port of a PPP. For example, in 'normal' power mode, the PPP may manage the application of PoE power to a port based upon whether a device is connected to a port and/or the type of device connected to the port and/or power consumption monitoring; in 'forced with device check' power mode, the PPP may apply PoE power to a port when a device is connected to the port, regardless of the type of device connected and/or without power consumption monitoring; and in 'forced' power mode, the PPP may apply PoE power to a port without checking for a device or any power consumption monitoring.

It will be appreciated that various of the above-disclosed and other features and functions, or alternatives thereof, may be desirably combined into many other different systems or applications. For example, "a" may denote the use of one or more elements. The lists presented herein are intended to be exemplary rather than limiting. Also, variations presently unforeseen or unanticipated alternatives, modifications, variations or improvements therein may be subsequently made by those skilled in the art, and are also intended to be encompassed by the following claims.

What is claimed is:

1. A powered patch panel comprising:
    a memory that stores a control parameter;
    a plurality of ports, each port configured to support a network communication connection;
    a processor that configures at least one of the plurality of ports to selectively supply power to a powered device over the network communication connection based on the control parameter;
    first and second power input ports, each of said first and second power input ports comprising a positive terminal and a negative terminal, power from the first power input port being combined with power from the second input port into a single power source;
    a first diode connecting to either the positive or the negative terminal of the first power input port and a second diode connecting to the corresponding terminal of the second power input port, the first and second diodes connecting to a first node, and the terminals of the first and second power input ports that are not connected to the first and second diodes being connected to a second node;
    an in-line current manager connecting to the first and second nodes to supply power to connected powered devices; and
    an analog-to-digital converter configured to monitor voltages of the first and second power input ports and the first and second nodes, wherein the processor is configured to determine a status of power supplied to the first and second power input ports based on the voltages monitored by the analog-to-digital converter.

2. The powered patch panel of claim 1, wherein the control parameter includes a current limit threshold, and the processor is configured to set a current limit for at least one of the plurality of ports based on the current limit threshold.

3. The powered patch panel of claim 1, further comprising:
    a first power-plane and a second power-plane, the first and second power-planes being separately powered;
    a common circuit;
    a port circuit, the first power-plane configured to provide power to the common circuit and the second power-plane configured to provide power to the port circuit; and
    a register receiving power from the second power-plane, the common circuit communicating with the port circuit via a power isolator.

4. The powered patch panel of claim 1, wherein the in-line current manager is connected to independent power planes serving different portions of the powered patch panel through independent fuses, and the in-line current manager is connected to the connected powered devices through one of the fuses.

5. The powered patch panel of claim 1, further comprising:
    a legacy detection support circuit; and
    a switch having a first position and a second position,
    wherein the legacy detection support circuit is configured to:
        determine a characteristic of the powered device connected to the port based on a first current and a second current, and
        measure the first current through the switch in the first position when a first test voltage is applied to the switch and measure the second current through the switch in the second position when a second test voltage is applied to the switch.

6. The powered patch panel of claim 1, further comprising a plurality of LEDs associated with the ports, at least one of the LEDs indicating at least one of a status of the port or a value of a stored control parameter.

7. The powered patch panel of claim 1, further comprising a common circuit and a port circuit configured to receive power from separate and isolated power planes, wherein the port circuit comprises a current manager, a power-over-Ethernet (PoE) manager, and an LED manager, each of the current manager, the PoE manager, and the LED manager comprising a state machine and registers, the state machine and registers in communication with the processor through at least one of an optical isolator or a capacitive isolator.

8. A powered patch panel comprising:
a plurality of ports, each port configured to support a network communication connection;
a common circuit that stores control parameters and controls the powered patch panel based upon the control parameters;
a port circuit that supplies power to a powered device connected to one of the ports over a network communication connection based on one or more of the control parameters;
a common circuit power-plane that provides power to the common circuit;
a port circuit power-plane that provides power to the port circuit;
a diode circuit that receives power from a power supply;
an in-line current manager that receives power from the diode circuit and provides power to the common circuit power-plane and the port circuit power-plane;
an analog-to-digital converter that monitors power received from the diode circuit and power output by the in-line current manager;
a first optical coupler that receives from the analog-to-digital converter a digital representation of at least one of a voltage received by the diode circuit from the first power supply, a voltage received by the diode circuit from the second power supply, a voltage output from the in-line current manager, or a current output from the in-line current manager and relays the digital representation to the common circuit; and
a second optical coupler that relays the control parameters to the port circuit from the common circuit.

9. The powered patch panel of claim 8, wherein the port circuit further comprises:
a current manager that limits current flow to the powered device over the network communication connection based on a value set in a register and received from the common circuit;
a PoE manager that monitors a port to detect the presence and a characteristic of a powered device connected to the port;
an LED manager that controls an LED drive circuit to illuminate a port LED based on a value in a register and received from the common circuit; and
a legacy support manager that determines whether a powered device connected to a port is a first type of PoE device or a second type of PoE device.

10. The powered patch panel of claim 8, wherein the common circuit further comprises:
a memory that stores the control parameters;
an Ethernet switch that supports communication between the common circuit and an Ethernet network management port; and
a processor that receives the control parameters via the Ethernet network management port and instructs the memory to store the control parameters.

11. The powered patch panel of claim 10, wherein the Ethernet switch within the common circuit supports two Ethernet network management ports that support formation of a daisy-chain to connect multiple powered patch panels onto a single Ethernet network connection.

12. The powered patch panel of claim 8, further comprising a capacitive coupler that relays information from the legacy support manager to a processor in the common circuit, the information pertaining to the powered device connected to the port.

13. The powered patch panel of claim 8, further comprising:
a first fuse that connects the in-line current manager to the port circuit power-plane; and
a second fuse that connects the in-line current manager to the common circuit power-plane.

* * * * *